(12) United States Patent
Canto Michelotti

(10) Patent No.: US 11,236,812 B2
(45) Date of Patent: Feb. 1, 2022

(54) DECOUPLER WITH ONE-WAY CLUTCH AND FAIL-SAFE SYSTEM

(71) Applicant: ZEN S/A INDUSTRIA METALURGICA, Brusque (BR)

(72) Inventor: Alvaro Canto Michelotti, Brusque (BR)

(73) Assignee: ZEN S/A INDUSTRIA METALURGICA, Brusque (BR)

( * ) Notice: Subject to any disclaimer, the term of this patent is extended or adjusted under 35 U.S.C. 154(b) by 911 days.

(21) Appl. No.: 15/844,039

(22) Filed: Dec. 15, 2017

(65) Prior Publication Data

US 2018/0106355 A1 Apr. 19, 2018

Related U.S. Application Data

(63) Continuation-in-part of application No. 15/470,620, filed on Mar. 27, 2017, now Pat. No. 10,774,916,
(Continued)

(30) Foreign Application Priority Data

Sep. 10, 2012 (BR) .......................... 102012022803-3

(51) Int. Cl.
*F16H 55/36* (2006.01)
*F16D 41/20* (2006.01)
(Continued)

(52) U.S. Cl.
CPC .............. *F16H 55/36* (2013.01); *F16D 3/12* (2013.01); *F16D 3/72* (2013.01); *F16D 41/206* (2013.01);
(Continued)

(58) Field of Classification Search
None
See application file for complete search history.

(56) References Cited

U.S. PATENT DOCUMENTS 5,139,463 A 8/1992 Bytzek et al.
5,156,573 A 10/1992 Bytzek et al.
(Continued)

FOREIGN PATENT DOCUMENTS

DE 102009038221 2/2011
JP 2008-082508 4/2008
(Continued)

OTHER PUBLICATIONS

International Search Report for International Patent Application No. PCT/BR2013/000349, dated Feb. 4, 2014, 6 pages.
(Continued)

*Primary Examiner* — Michael R Mansen
*Assistant Examiner* — Mark K Buse
(74) *Attorney, Agent, or Firm* — Sheridan Ross P.C.

(57) ABSTRACT

The present invention relates to a decoupler with free wheel system and comprising a vibration damping pulley, a shaft actionable by the pulley, hub pieces having a first hub piece and a second hub piece, hub pieces being mounted between the inner race of the pulley and the outer surface of the shaft, at least one journal element between the shaft and pulley, along with a torsion spring, and a clutch spring, with the first hub piece being mounted on the shaft and the second hub piece being mounted around the shaft and can rotate relative to it, the torsion spring being disposed between the outer race of the hub pieces and the inner race of pulley, having a first end operatively attachable to the pulley and a second end operatively attachable to the second hub piece and the clutch spring being disposed internally in relation to the
(Continued)

torsion spring and which is frictionally engaged with the hub pieces for transmission of torque to the shaft.

4 Claims, 22 Drawing Sheets

Related U.S. Application Data which is a continuation of application No. 14/238,787, filed as application No. PCT/BR2013/000349 on Sep. 9, 2013, now Pat. No. 9,605,743.

(51) Int. Cl.
*F16D 3/12* (2006.01)
*F16D 3/72* (2006.01)

(52) U.S. Cl.
CPC .... *F16D 2300/22* (2013.01); *F16H 2055/366* (2013.01)

(56) References Cited

U.S. PATENT DOCUMENTS

| | | | |
|---|---|---|---|
| 5,722,909 A | 3/1998 | Thomey | |
| 6,044,943 A | 4/2000 | Bytzek et al. | |
| 6,083,130 A | 7/2000 | Mevissen et al. | |
| 6,394,247 B1* | 5/2002 | Monahan | F16D 41/206 192/41 S |
| 6,394,248 B1 | 5/2002 | Monahan et al. | |
| 7,070,033 B2 | 7/2006 | Jansen et al. | |
| 7,153,227 B2 | 12/2006 | Dell et al. | |
| 7,207,910 B2 | 4/2007 | Dell et al. | |
| 7,275,630 B2 | 10/2007 | Jansen et al. | |
| 7,618,337 B2 | 11/2009 | Jansen et al. | |
| 7,624,852 B2 | 12/2009 | Mevissen et al. | |
| 7,712,592 B2* | 5/2010 | Jansen | F16D 3/52 192/41 S |
| 7,766,774 B2 | 8/2010 | Antchak et al. | |
| 7,954,613 B2 | 6/2011 | Mevissen et al. | |
| 7,975,821 B2 | 7/2011 | Antchak et al. | |
| 8,006,819 B2 | 8/2011 | Dell et al. | |
| 8,021,253 B2 | 9/2011 | Dell et al. | |
| 8,047,920 B2* | 11/2011 | Jansen | F16D 3/72 464/60 |
| 8,132,657 B2 | 3/2012 | Antchak et al. | |
| 8,302,753 B2 | 11/2012 | Antchak et al. | |
| 8,789,670 B2 | 7/2014 | Antchak et al. | |
| 9,046,169 B2 | 6/2015 | Cali et al. | |
| 9,140,319 B2 | 9/2015 | Williams | |
| 9,151,366 B2 | 10/2015 | Antchak et al. | |
| 9,181,989 B2 | 11/2015 | Mevissen et al. | |
| 9,194,438 B2 | 11/2015 | Dell | |
| 9,267,552 B2 | 2/2016 | Boyes et al. | |
| 9,334,932 B2 | 5/2016 | Antchak et al. | |
| 9,341,243 B2 | 5/2016 | Replete et al. | |
| 9,441,680 B2 | 9/2016 | Boyes | |
| 9,441,681 B2 | 9/2016 | Williams | |
| 9,447,850 B2 | 9/2016 | Farewell et al. | |
| 9,464,697 B2 | 10/2016 | Antchak et al. | |
| 9,605,743 B2* | 3/2017 | Canto Michelotti | F16D 41/206 |
| 2003/0051960 A1* | 3/2003 | Li | F16D 7/027 192/28 |
| 2010/0009796 A1* | 1/2010 | Fitz | F16H 55/36 474/197 |
| 2011/0065537 A1* | 3/2011 | Serkh | F16H 55/36 474/94 |
| 2011/0281678 A1* | 11/2011 | Cali | F16D 3/02 474/171 |
| 2012/0299415 A1* | 11/2012 | Antchak | F16D 41/206 310/78 |
| 2013/0059685 A1* | 3/2013 | Cali | F16F 15/1245 474/91 |
| 2013/0087428 A1* | 4/2013 | Antchak | F16F 15/123 192/41 S |
| 2013/0098727 A1* | 4/2013 | Williams | F16H 55/36 192/56.2 |
| 2013/0150191 A1* | 6/2013 | Ishida | F16H 55/36 474/94 |
| 2013/0260932 A1 | 10/2013 | Adam et al. | |
| 2013/0345004 A1* | 12/2013 | McCrary | F16D 3/12 474/148 |
| 2014/0076683 A1* | 3/2014 | Williams | F16D 27/105 192/41 S |
| 2014/0209428 A1 | 7/2014 | Dell | |
| 2014/0287860 A1 | 9/2014 | Ma et al. | |
| 2015/0041277 A1* | 2/2015 | Boyes | F16D 27/14 192/80 |
| 2015/0148161 A1 | 5/2015 | Gajewski et al. | |
| 2015/0252886 A1 | 9/2015 | Cali et al. | |
| 2015/0285317 A1* | 10/2015 | Lannutti | F16D 41/06 192/41 R |
| 2016/0230855 A1 | 8/2016 | Antchak et al. | |
| 2017/0227108 A1 | 8/2017 | Michelotti | |
| 2017/0298995 A1* | 10/2017 | Serkh | F16D 7/022 |
| 2018/0023638 A1* | 1/2018 | Kastner | F16D 13/76 192/41 R |
| 2018/0106355 A1* | 4/2018 | Canto Michelotti | F16D 3/12 |
| 2018/0142738 A1* | 5/2018 | Antchak | F16D 41/206 |

FOREIGN PATENT DOCUMENTS

| | | |
|---|---|---|
| WO | WO 2010/099605 | 9/2010 |
| WO | WO 2011/143580 | 11/2011 |
| WO | WO 2011/160208 | 12/2011 |
| WO | WO 2012/031361 | 3/2012 |
| WO | WO 2012/061930 | 5/2012 |
| WO | WO 2012/061936 | 5/2012 |
| WO | WO 2013/003937 | 1/2013 |
| WO | WO 2013/003950 | 1/2013 |
| WO | WO 2013/033822 | 3/2013 |
| WO | WO 2013/033825 | 3/2013 |
| WO | WO 2013/131166 | 9/2013 |

OTHER PUBLICATIONS

Written Opinion for International Patent Application No. PCT/BR2013/000349, dated Feb. 4, 2014, 10 pages.
International Preliminary Report on Patentability for International Patent Application No. PCT/BR2013/000349, dated Mar. 10, 2015, 11 pages.
Official Action for U.S. Appl. No. 14/238,787, dated May 20, 2016 8 pages Restriction Requirement.
Official Action for U.S. Appl. No. 14/238,787, dated Sep. 14, 2016 11 pages.
Notice of Allowance for U.S. Appl. No. 14/238,787, dated Jan. 27, 2017 5 pages.
Official Action for U.S. Appl. No. 15/470,620, dated Feb. 2, 2019 5 pages Restriction Requirement.
Official Action for U.S. Appl. No. 15/470,620, dated Jun. 25, 2019 15 pages.
Official Action for U.S. Appl. No. 15/470,620, dated Jan. 31, 2020 13 pages.
Notice of Allowance for U.S. Appl. No. 15/470,620, dated May 12, 2020 7 pages.

* cited by examiner

DECOUPLER WITH ONE-WAY CLUTCH AND FAIL-SAFE SYSTEM

CROSS-REFERENCE TO RELATED APPLICATIONS

This application is a continuation-in-part of U.S. application Ser. No. 15/470,620 having a filing date of Mar. 27, 2017, which is a continuation of U.S. application Ser. No. 14/238,787 having a filing date of 13 Feb. 2014, which is a national stage application under 35 U.S.C. 371 of PCT Application No. PCT/BR2013/000349 having an international filing date of 9 Sep. 2013, which designated the United States, and wherein the PCT application claimed the benefit of Brazil Application No. BR102012022803-3 filed on 10 Sep. 2012, the entire disclosure of each application being incorporated herein by reference.

FIELD OF THE INVENTION

The present invention relates to a decoupler system with free wheel operation and a vibration damping mechanism that can be applied to mechanical connections, such as alternators in vehicles. The decoupler mechanism according to the invention has a fail-safe system and can also be configured to operate as a one-way clutch in a simple way.

BACKGROUND

Overrunning alternator decouplers (OADs) with a free wheel system are used in some types of drive connections such as electrical alternators in automotive vehicles, among others, to enable the transmission of power from a drive shaft to a driven shaft, so that the driven shaft can rotate at a faster speed than the drive shaft or in a different direction of rotation. In these situations, the decoupler allows overrunning between the driving shaft and the driven shaft, providing a free wheel system which allows the two shafts to rotate independently of each other. Furthermore, the decoupler also allows to change the natural resonance frequency of the accessory belt system of an internal combustion engine, reducing noise and vibration of the system as a whole and increasing the useful life of some critical components such as the belt tensioner.

In some torque transmission couplings using a pulley driven by a belt to transmit torque to a shaft, a clutch spring or wrap spring is disposed inside the pulley, in direct contact with the pulley inner race. The axle hub or the driven shaft is arranged internally to the clutch spring, so that the clutch spring performs the torque transmission function. In any event, a friction contact between the clutch spring and the inner surface of the pulley is required so that the driving shaft is coupled to the driven shaft. This friction involves high levels of compression and may cause great wear on the components of the clutch, and in particular on the pulley. To support the high stress levels and to provide acceptable durability of the system, the pulley, and especially its inner race, must be made of a very resistant material, such as steel, and has to be preferably submitted to a heat treatment to increase its strength. These requirements increase the weight and cost of the decoupler, and require more complex production processes.

In addition, the decoupler mechanism should comprise a torsion spring or other equivalent means which can substantially alter the natural resonant frequency (as previously mentioned), and thus ensure improved power transmission performance. Typically, this spring is disposed inside the clutch spring, between it and the shaft or axle hub. To provide the vibrational damping effect, the torsion spring need not exert a contact friction with the other components of the decoupler. However, the larger is the spring, the greater is its strength for the required level of torque for the application. However, the dimensions of the torsion spring are limited by the reduced internal space of the clutch spring.

The document WO2012061936, for example, describes a decoupler which is positionable between an axis (for example, for an alternator shaft), and a power transmission element (for example, an accessory drive belt) on an engine. The decoupler includes an axle hub that is mounted in the pulley, engaging the power transmission member and a spring that provides isolation between the hub and the shaft. The decoupler provides damping at a preset value between the hub and the pulley. This document shows the clutch spring in contact with the track on the inside surface of the pulley to provide frictional engagement, and the torsion spring disposed internally to the spring clutch, providing vibration damping.

The document WO2012061930, for example, refers to a decoupler assembly for use between an axis and an element used to drive the shaft. The decoupler includes a pulley, a hub and a coil torsion spring. The two ends of the spring are engageable, at least indirectly, to the pulley and the hub for the transfer of torque therebetween. At least one end of the spring engages an engagement structure (on either the pulley or the hub) that includes a helical axial shoulder and a driver wall. The spring transfers torque in one direction through the driver wall (for example, when the pulley rotates faster than the hub), but the end of the spring is not fixedly attached to the driver wall. This invention does not allow simultaneous freewheel and anti-vibration damping, nor can any other invention be found in the state of the art showing these two features together, while also using a pulley body of lightweight material.

Another drawback found in the state of the art of decouplers, such as the previous documents mentioned here, is the occurrence of leakage of the grease used to lubricate the clutch spring, torsion spring and other parts, due to centrifugal force generated when the decoupler is in operation. As can be seen in the decouplers of the prior art documents cited here, the axle hub or the bearings are usually in direct contact with the inner race of the pulley, precisely in the region in which the grease is thrown by centrifugal force. This contact zone between the axle hub and pulley is not completely leakage-free Seals may be used to reduce leakage between these parts, but the incorporation of seals means an additional component to the decoupler assembly, which increases the complexity of construction and its cost. In addition, the springs are not completely isolated within the interior of the decoupler housing, which also contributes to the leakage of grease.

In addition, there are no examples in the prior art of an OAD with a fail-safe design which would enable the decoupler to continue to operate for a period of time, in the case of failure or breakage of the torsion spring. In all examples of previous decouplers, when the torsion spring breaks, the pulley loses all function, failing to transmit torque to the driven shaft. If the application of the decoupler is on an automotive alternator, the vehicle will only operate until the battery runs out, and then the vehicle will stop completely due to battery discharge because the alternator is no longer providing electrical energy.

Fail-safe mechanisms would allow the decoupler to continue to operate as if it was a rigid pulley, at least for a period of time, until the damaged pulley can be replaced. Finally, the decoupler with an integral free wheel system can operate as freewheel system only, such as one-way clutches (one-way clutch—OWC) without a vibration absorber system by means of a simple system adaptation.

SUMMARY OF THE INVENTION

A first object of the invention is to provide a decoupler that performs both free wheel and vibration damping functions, and, in which the pulley can be made of lower strength materials, without surface treatments, with low cost and good durability.

Another objective of the invention is to provide a decoupler with a torsion spring of a larger diameter, thereby providing higher torque capacity in the same space available to the system, thereby minimizing the potential failure of breakage of the torsion spring if overloaded. This advantage allows the higher torque on the torsion spring without the use of additional components which limit the torque and decrease the tension on the torsion spring.

Another objective of the invention is to provide a decoupler endowed with simple construction that is waterproof and can reduce grease leakage due to centrifugal force. It is also the object of the invention to provide a decoupler with a fail-safe mechanism, which allows the assembly to continue to operate, ensuring that the torque continues to be transmitted, even in case of failure or breakage of the torsion spring or clutch spring.

Finally, it is an object of the invention to provide a decoupler that can operate as a decoupled OAD as well as a unidirectional clutch, from simple modifications to the construction of the assembly.

The objectives of the invention are achieved by a decoupler with free wheel system and vibration dampening comprising: a pulley, a shaft actionable by the pulley, an axle hub having a first hub piece and a second hub piece, the hub being coupled between the inner race of the pulley and the outer surface of the shaft, at least one journal element between the shaft and pulley, a torsion spring, a clutch spring, wherein the first hub piece is coupled in a torsion proof manner on the shaft and the second hub piece is mounted around the shaft and can rotate relative to it, the torsion spring is arranged between the outer race of the hub and the inner race of the pulley having a first end operatively couplable to the pulley and a second end operatively couplable to the second hub piece, and the clutch spring is arranged internally in relation to the torsion spring and is frictionally couplable to the hub for transmission of torque to the shaft.

In one embodiment, the second hub piece may have a radial wall extending radially to the inner race of the pulley, and the first and second hub pieces are disposed with a gap between them. The clutch spring may be disposed between the external surface of the shaft and the inner surfaces of the axle hub, being frictionally engaged with the inner surfaces of the hub pieces, or between the outer surface of the axle hub and the inner surface of the torsion spring, being frictionally engaged with the outer surfaces of the axle hub.

Preferably, the shaft has a first ending region, which fits a portion of smaller inner diameter of the first hub piece, a second ending region, which interference fits a bearing element, and a center region with a smaller outer diameter than the first and the second shaft ending regions Preferably, at least one bearing element is mounted between the pulley and the first axle hub piece. At least one bearing element is mounted between the pulley and the shaft, allowing relative rotational movement between the pulley and the shaft. The bearing element can comprise at least one of a roller bearing, a bearing bushing and a bearing ring.

The pulley inner race may comprise a stopper, which fits to the torsion spring first ending and the pulley outer race may comprise a stopper, which fits to the torsion spring second ending when the pulley is in rotational movement.

Alternatively, the pulley comprises a first portion with smaller inner diameter, which extends radially towards the axles hub, and a center portion with greater inner diameter, that makes a housing cavity side in which is set the torsion spring, this housing cavity side being closed by a grease leakage wall formed by the transition between the pulley smaller inner diameter and the pulley greater inner diameter, and the axially opposed side is limited by hub second piece. Alternatively, the decoupler comprises a bearing ring mounted to the pulley inner race, and a bearing bushing mounted between the first hub piece and the bearing ring, wherein the bearing ring has a stopper that fits the torsion spring first ending when the pulley is in rotational movement, and wherein a torsion spring is set inside a housing cavity limited by the bearing ring in the axial direction and by the hub second piece.

Preferably, the housing cavity has an axial length smaller than the torsion spring axial length, so that the torsion spring disposed inside the housing exerts an axial force F1 upon the hub second piece, and the hub second piece exerts a friction force F at at least upon the bearing element, when the hub second piece rotates relative to the pulley.

Alternatively, the hub second piece has a portion of greater inner diameter and a portion of smaller inner diameter, providing a cavity between the portion of greater inner diameter and the portion of smaller inner diameter, the hub first piece having a portion of smaller inner diameter, which interference fits on the shaft, and a portion of greater inner diameter, providing a cavity between the portion of smaller inner diameter and the portion of greater inner diameter, the cavity provided in the hub second piece being arranged in contiguity with the cavity provided in the hub first piece, and the clutch spring being set inside the cavities of the first hub and the second hub.

The first hub piece and the second hub piece have, each, an inner end with coupling means through which the two hub pieces are coupled together. One seal member is optionally positioned on the gap between the first hub piece and the second hub piece.

The decoupler may comprise a washer mounted by interference fit with the shaft and extending radially to the pulley, the washer being arranged in contact with a face of the radial wall of the second hub piece, the washer has a shoulder on its face in contact with the wall, and the wall has a shoulder on its face in contact with the washer, the wall and washer are positioned so that the shoulder of the washer is angularly displaced relative to the shoulder of the wall, so that when an overload is applied to the second hub piece, the shoulder of the washer rotates and overlaps the shoulder of the wall, causing the second hub piece to move toward the first hub piece and the first and second hub pieces are locked by interference between them. The shoulder of the washer and the shoulder of the wall each have a thickness of size equal to the clearance between the second hub piece and the first hub piece. The inner race of the pulley has a recess in the region of contact with the radial wall of the second hub piece and the washer, the recess having an internal stop which can contact the radial wall, locking the second hub piece to prevent rotation relative to the pulley only when the shoulder overlaps the shoulder. The pulley may be made of steel, aluminum or polymeric materials.

The objectives of the invention are also achieved by a one-way clutch with free wheel system comprising a pulley, a shaft actionable by the pulley, a hub mounted between the inner race of the pulley and the outer surface of the shaft, at least one journal element between the shaft and pulley, and a clutch spring frictionally engaged with the hub for transmission of torque to the shaft, wherein the hub pieces comprises a first hub piece coupled in a torsionproof manner to the axle and a second hub piece rotatably mounted around the shaft, and the first and second hub pieces are arranged with a gap between them, the one-way clutch further comprising a coupling means between the second hub piece and pulley, the coupling means coupling the pulley with the second hub piece with torque transmission when the pulley rotates in one direction.

The second hub piece preferably has a radial wall extending radially to the inner race of the pulley, and the inner race of the pulley has an internal stop which contacts the radial wall, locking the second hub piece in a rotation proof manner relative to the pulley when the pulley rotates in one direction.

The objectives of the invention are also achieved by a decoupler with free wheel system comprising a pulley, a shaft actionable by the pulley, a hub having a first hub piece and a second hub piece, the hub pieces being coupled between the inner race of the pulley and the outer surface of the shaft, at least one journal element between the shaft and pulley, and a clutch spring frictionally attachable to the hub pieces for transmission of torque to the shaft, wherein the hub comprises a first hub piece coupled in a rotation proof manner to the axle and a second hub piece which is rotationally mounted around the shaft, the second hub piece having a radial wall extending radially to the inner race of the pulley, the first and second hub pieces being arranged with a gap between them, the decoupler further comprising a stop washer mounted by interference fit to the shaft and extending radially to the pulley, the stop washer being arranged in contact with one face of the radial wall of the second hub piece, the washer has a shoulder on its face in contact with the wall, and the wall has a shoulder on its face in contact with the washer, the wall and washer are mounted so that the shoulder of the washer is angularly displaced with respect to the shoulder of the wall, and when an overload is applied to the second hub piece, shoulder of washer overlaps the shoulder of washer, so that the second hub piece is shifted toward the first hub piece and the first and second hub piece are locked by interference between them.

Preferably, the washer and the shoulder of the wall having a thickness of size equal to the clearance between the second hub piece and the first hub piece. The inner race of the pulley has a recess in the region of contact with the radial wall of the second hub piece and the washer, the recess having an internal stop which can contact the radial wall, locking the second hub piece in a rotation proof manner to the pulley only when the shoulder overlaps the shoulder.

It is another object of the invention to provide longitudinally oriented one-way clutches and radially oriented one-way clutches. Regarding longitudinally oriented clutches, these clutches can include roller and sprag clutches that allow for a single-piece hub, which can improve the longevity of the decoupler and provide a more compact decoupler. In addition, a radially oriented one-way clutch, such as a one-way thrust bearing, provides a more compact decoupler and can also contribute to the reduction of noise and vibration of the system.

One particular embodiment of the present invention is a decoupler, comprising a pulley rotatable about a longitudinal axis, the pulley defining an inner cavity and having a pulley endstop extending into the inner cavity; a pulley endstop positioned in the inner cavity and operably engaged with the pulley; a torsion spring positioned in the inner cavity about the shaft, the torsion spring having a first endstop and a second endstop, wherein the first endstop of the torsion spring is operably engaged with the pulley endstop; a hub positioned in the inner cavity about the shaft, the hub having a hub endstop, wherein the second endstop of the torsion spring is operably engaged with the hub endstop; a clutch race positioned in the inner cavity about the shaft, the clutch race interconnected with the shaft such that the clutch race rotates with the shaft; a one-way clutch positioned in the inner cavity about the shaft, the one-way clutch interconnected to the hub such that the pulley transmits torque to the one-way clutch via the torsion spring and the hub, the one-way clutch having a plurality of rollers that engage the clutch race, each roller in the plurality of rollers having an axis of rotation that extends through the longitudinal axis; wherein in a first direction of rotation of the one-way clutch, the plurality of rollers freely rotates against the clutch race, and the pulley does not transmit torque to the shaft via the one-way clutch; and wherein in a second direction of rotation of the one-way clutch, the plurality of rollers engages the clutch race, and the pulley transmits torque to the shaft via the one-way clutch.

In some embodiments, the decoupler further comprises a first bearing element and a second bearing element positioned between the pulley and the shaft, the bearing elements configured to permit rotation between the pulley and the shaft, and wherein the bearing elements define the inner cavity. In various embodiments, the hub is positioned between the torsion spring and the second bearing element, the one-way clutch operably positioned between the hub and the second bearing element, and the clutch race is positioned between the one-way clutch and the second bearing element. In some embodiments, the decoupler further comprises a bearing ring interconnected to the pulley, wherein one of the pulley and the bearing ring comprises the pulley endstop. In various embodiments, an axial length between the pulley end stop and the hub endstop is smaller than an axial length of the torsion spring in a relaxed state, wherein the torsion spring exerts an axial force on the hub to produce a controlled friction. In some embodiments, the one-way clutch is a one-way thrust bearing.

Another particular embodiment of the present invention is a decoupler, comprising a pulley rotatable about a longitudinal axis, the pulley defining an inner cavity and configured to selectively transmit torque to a shaft; a first bearing element and a second bearing element positioned between the pulley and the shaft to further define the inner cavity, the bearing elements configured to permit rotation between the pulley and the shaft; a torsion spring positioned in the inner cavity about the shaft, the pulley configured to transmit torque to the torsion spring, a hub positioned in the inner cavity about the shaft, the hub positioned between the torsion spring and the second bearing element, and wherein the torsion spring is configured to transmit torque to the hub; a clutch race positioned in the inner cavity about the shaft, the clutch race positioned between the hub and the second bearing element, and wherein the clutch race is interconnected with the shaft such that the clutch race rotates with the shaft; a one-way clutch interconnected to the hub and positioned in the inner cavity about the shaft, the one-way clutch positioned between the hub and the clutch race such that the one-way clutch engages the clutch race; wherein in a first direction of rotation of the one-way clutch, the pulley transmits torque to the shaft via the one-way clutch; and wherein in a second direction of rotation of the one-way clutch, the pulley does not transmit torque to the shaft via the one-way clutch.

In various embodiments, the one-way clutch comprises a plurality of rollers that engage the clutch race, each roller in the plurality of rollers having an axis of rotation that extends through the longitudinal axis. In some embodiments, the decoupler further comprises a bearing ring interconnected to the pulley, the bearing ring having a pulley endstop configured to transmit torque from the pulley to the torsion spring. In various embodiments, an axial length between the first bearing element and the hub is smaller than an axial length of the torsion spring in a relaxed state, wherein the torsion spring exerts an axial force on the hub to produce a controlled friction. In some embodiments, the one-way clutch is a one-way thrust bearing. In various embodiments, the bearing elements are at least one of a roller bearing, a bearing bushing, and a bearing ring.

Yet another particular embodiment is a decoupler, comprising a pulley rotatable about a longitudinal axis, the pulley having an inner surface defining an inner cavity, the pulley configured to selectively transmit torque to a shaft; a pulley endstop positioned in the inner cavity and operably engaged with the pulley; a torsion spring positioned in the inner cavity about the shaft, the torsion spring having a first endstop and a second endstop, wherein the first endstop of the torsion spring is operably engaged with the pulley endstop; a hub positioned in the inner cavity about the shaft, the hub having a hub endstop, wherein the second endstop of the torsion spring is operably engaged with the hub endstop; a one-way clutch positioned in the inner cavity about the shaft, the one-way clutch positioned between the hub and the shaft and interconnected to the hub such that the pulley transmits torque to the one-way clutch via the torsion spring and the hub, the one-way clutch having a plurality of rollers that engage an outer surface of the shaft, each roller in the plurality of rollers having an axis of rotation that is substantially parallel to the longitudinal axis; wherein in a first direction of rotation of the one-way clutch, the plurality of rollers rotates freely against the outer surface of the shaft, and the pulley does not transmit torque to the shaft via the one-way clutch; and wherein in a second direction of rotation of the one-way clutch, the plurality of rollers engages the outer surface of the shaft, and the pulley transmits torque to the shaft via the one-way clutch.

In some embodiments, the one-way clutch is a roller clutch, and each of the rollers is biased in the same direction as the first direction of rotation. In various embodiments, the one-way clutch is a sprag clutch that comprises at least one asymmetrically-shaped sprag positioned between two rollers of the plurality of rollers. In some embodiments, the decoupler further comprises a first bearing element and a second bearing element positioned between the pulley and the shaft, the bearing elements configured to permit rotation between the pulley and the shaft, and wherein the bearing elements further define the inner cavity. In various embodiments, the hub is positioned between the torsion spring and the second bearing element, the one-way clutch operably positioned between the hub and the second bearing element, and the clutch race is positioned between the one-way clutch and the second bearing element. In some embodiments, the bearing elements are at least one of a roller bearing, a bearing bushing, and a bearing ring. In various embodiments, the decoupler further comprises a bearing ring interconnected to the pulley, wherein one of the pulley and the bearing ring comprises the pulley endstop. In some embodiments, an axial length between the pulley end stop and the hub endstop is smaller than an axial length of the torsion spring in a relaxed state, wherein the torsion spring exerts an axial force on the hub to produce a controlled friction.

A further particular embodiment of the present invention is a decoupler having an engageable fail-safe feature, comprising a pulley rotatable about a longitudinal axis, an inner surface of the pulley defining an inner cavity and the pulley configured to selectively transmit torque to a shaft; a hub positioned in the inner cavity, the hub operatively connected to the pulley and the hub is rotatable about the shaft; a raised shoulder of the hub, the raised shoulder extending in an axial direction by a predetermined distance; a clutch spring frictionally coupled to the hub and the shaft to selectively transmit torque from the pulley and the hub to the shaft, a washer interconnected to an inner surface of the pulley, the washer having a raised shoulder extending in the axial direction by the predetermined distance; wherein, in an unengaged mode, the shoulder of the hub and the shoulder of the washer overlap in the axial direction, and the hub and a portion of the shaft are separated in the axial direction by the predetermined distance; wherein, in an engaged mode, the shoulder of the hub and the shoulder of the washer contact each other to move the hub into contact with the portion of the shaft to engage the hub to the shaft.

In various embodiments, the decoupler further comprises a torsion spring in the inner cavity, wherein the torsion spring provides the operative connection between the pulley and the hub. In some embodiments, the decoupler further comprises a sleeve interconnected to an inner surface of the pulley, wherein, in the engaged mode, the shoulder of the hub and the shoulder of the washer contact each other to move the hub into contact with the sleeve to engage the hub to the pulley.

BRIEF DESCRIPTION OF THE DRAWINGS

The present invention will, hereinafter, be described in more detail based on an example of execution represented in the drawings. The figures show.

DETAILED DESCRIPTION

The present invention relates to a decoupler with free wheel system and vibration damping mechanism, as shown in FIGS. 1 to 15, which can be used for different types of mechanical devices such as the coupling between pulleys and alternators in automotive vehicles.

Figure 1A:
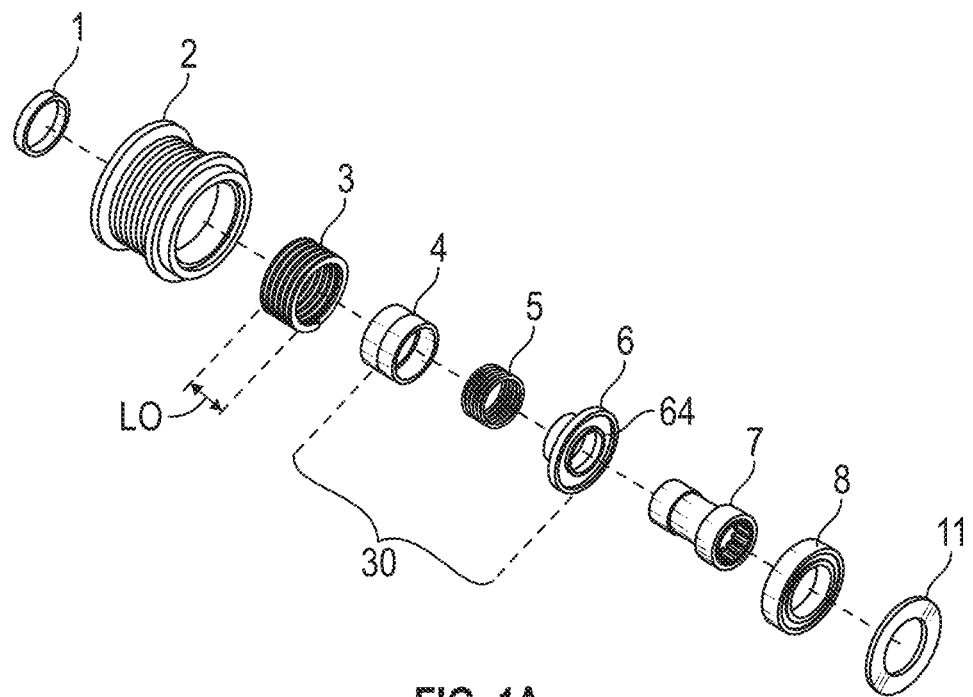
FIG. 1A—is an exploded view of the components of the decoupler according to a first embodiment of the invention.
Figure 2A:
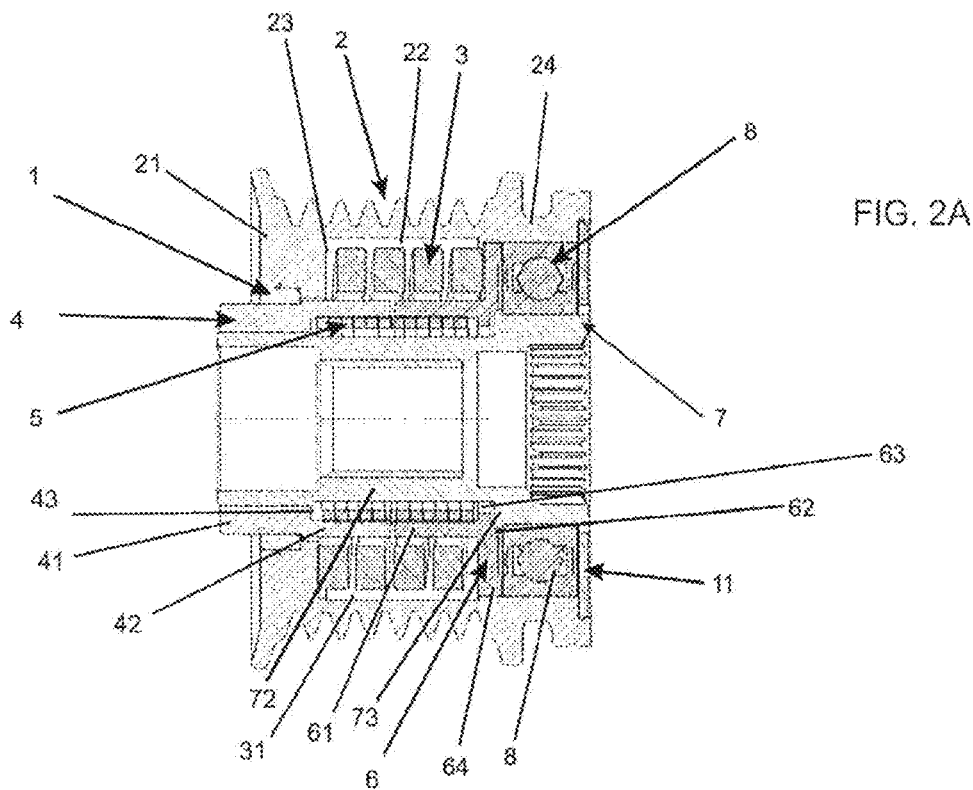
FIG. 2A—is a cross-sectional view of the decoupler shown in FIG. 1A in an assembled state.

As can be seen most clearly in FIGS. 1A and 2A, the decoupler comprises a shaft 7 to be driven, an axle hub 30 disposed around a driven shaft 7, a pulley 2 arranged externally to the axle hub 30 responsible for driving the shaft, at least one mechanical element for journaling and centering between the shaft 7 and the pulley 2, a torsion spring 3 and a clutch spring 5. The torsion spring 3 is disposed between the outer race of the axle hub 30 and the inner race of the pulley 2 with a first end operatively attachable to the pulley 2 and a second end operably attachable to the axle hub 30.

The clutch spring 5 is disposed radially inward of the torsion spring 3 and is frictionally attachable to the axle hub 30 to transmit torque to the shaft 7. In the embodiment of the invention shown in the figures, the clutch spring 5 is disposed between the outer surface of the shaft 7 and the inner surfaces of the axle hub 30, so that it is frictionally attachable to the inner surfaces of the axle hub 30. However, according to another preferred embodiment of the invention not shown, the clutch spring 5 can be disposed between the outer race of the axle hub 30 and the inner surface of the torsion spring 3, so that it is frictionally attachable to the outer surfaces of the axle hub 30.

Figure 5A:
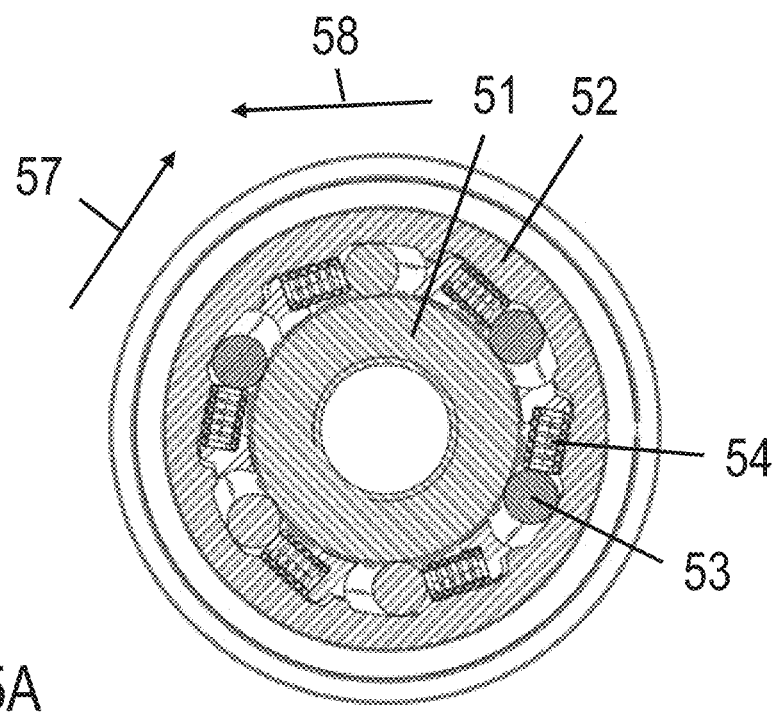
FIG. 5A—is a cross-sectional view of a one-way clutch that is a roller clutch.
Figure 5B:
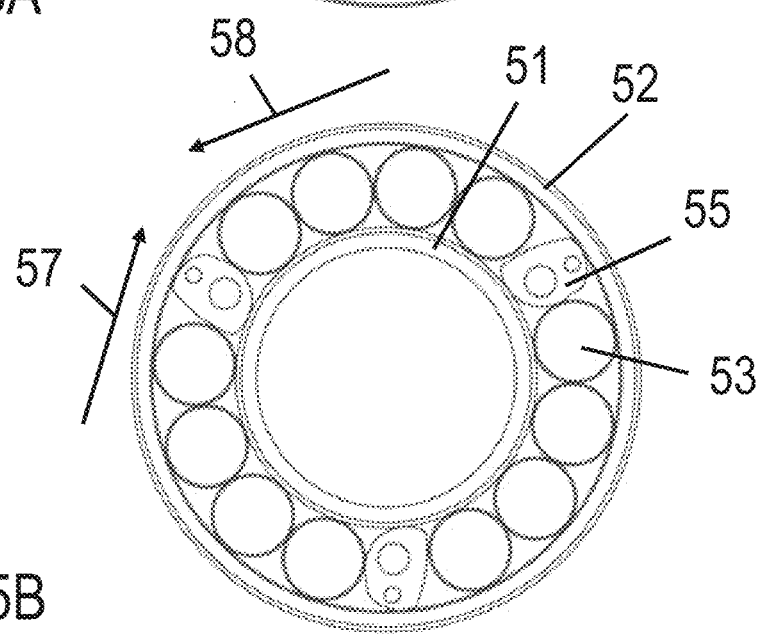
FIG. 5B—is a cross-sectional view of a one-way clutch that is a sprag clutch with unbiased sprags.
Figure 5C:
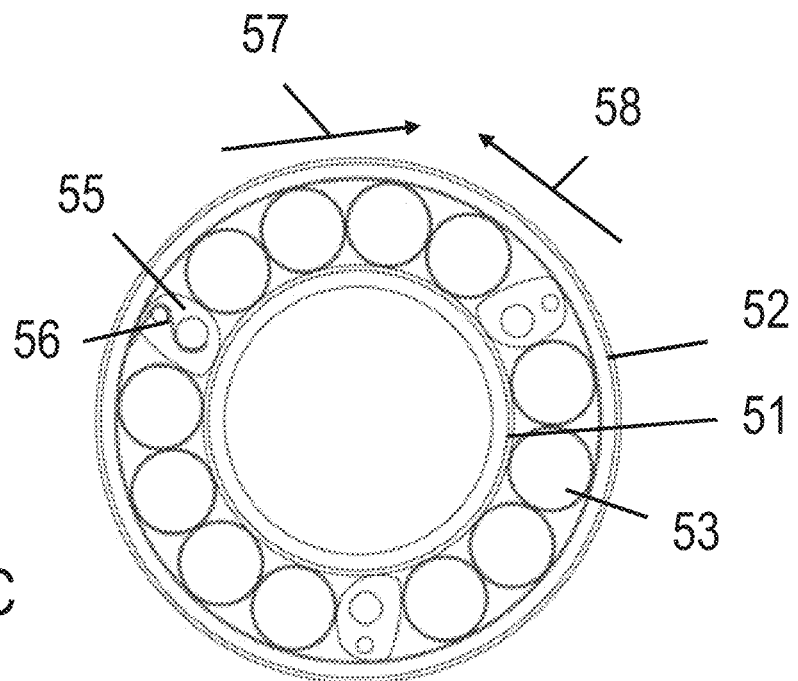
FIG. 5C—is a cross-sectional view of a one-way clutch that is a sprag clutch with at least one biased sprag in one embodiment with a leaf spring to constrain the sprag against both races.
Figure 5D:
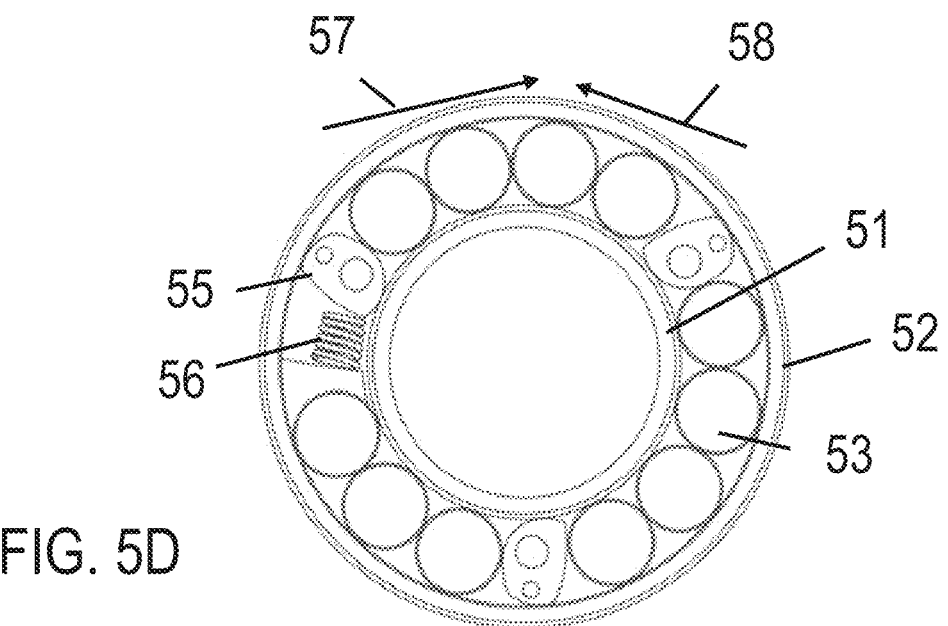
FIG. 5D—is a cross-sectional view of a one-way clutch that is a sprag clutch with at least one biased sprag in another embodiment with a helical spring to constrain the sprag against both races.
Figure 6:
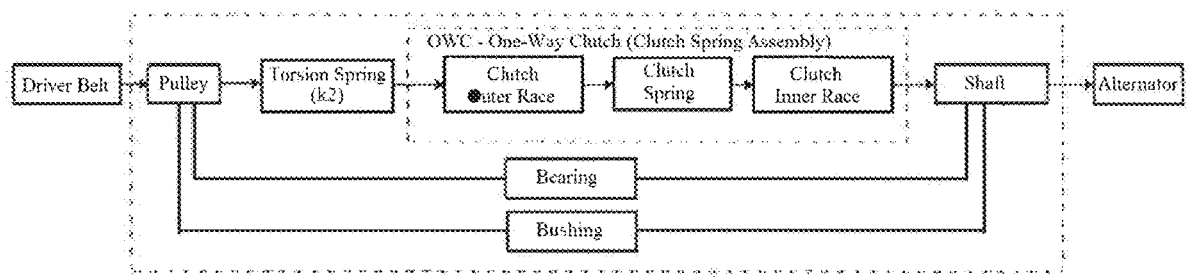
FIG. 6—is a block diagram schematically showing the internal arrangement of the decoupler in accordance with the invention.

FIG. 6 shows a schematic representation of the invention illustrating the functional components of the decoupler in a block diagram form in such a way that the outermost component, the accessory drive belt, is shown to the left, and the components which are being successively coupled internally are shown toward the right, ending with the innermost element, the driven shaft, which can be coupled to an alternator. FIG. 6 clearly identifies how this invention is distinguishable from state of the art decouplers which comprise a belt-driven pulley with an internal torsion spring 3. Internal to the torsion spring is disposed a one-way clutch assembly comprising the axle hub 30 and the clutch spring, whose inner race performs the torque transmitting engagement with the driven shaft. The decoupler also has at least one journal element allowing relative rotation between the shaft 7 and the pulley 2. Preferably, this journal element is a bearing 8 and a bushing 1 disposed between the shaft and the drive pulley. The details of these parts, the layout and their engagement will be described in more detail below with references to FIGS. 1 to 15.

The pulley 2 is the component that provides the input torque that is transmitted to the shaft 7, so that the rotational motion of the pulley drives the rotation of the shaft. In a preferred embodiment of the invention, the shaft 7 is an alternator shaft driven by the pulley. The pulley 2 and the shaft 7 are rotatably coupled, however in view of the decoupler's operation, the shaft may rotate together with the pulley when both are in a coupled stated, or when in the disengaged state, the shaft may rotate at a different and greater speed than the pulley ("overrunning") or even in a different direction from the pulley. The pulley 2 has an outer surface provided with grooves for engagement of a drive belt (not shown) coupled to other components of a motor such that the belt drives the rotational movement of the pulley 2.

In a preferred embodiment of the invention which can be seen more clearly in FIG. 2A, the pulley 2 has a portion 21 with greater radial thickness and thus smaller inner diameter, which extends radially inward toward the first hub piece 4. It should be noted that the pulley still would function without this smaller diameter. A bushing 1 is positioned between the portion 21 of the pulley 2 and the outer surface of the first hub piece 4. The bushing 1 is responsible for journaling and centering between the shaft 7, the hub first piece 4 and the pulley 2, thereby allowing rotational movement between the shaft 7 and the pulley 2.

The pulley 2 also features a central portion 22 with greater diameter than the portion 21, thereby forming a side of an internal housing cavity 31, within which is disposed a torsion spring 3. The opposite side of the housing cavity 31 of the torsion spring 3 is limited in the axial direction by the second hub piece 6. In the region of transition between the smaller inner diameter of portion 21 and central portion 22 of larger inner diameter of the pulley 2, is formed a containment wall 23 which closes this side of the housing cavity 31 of the torsion spring, and performs the function of containment of leakage of grease used to lubricate the torsion spring 3. Containment of the grease is necessary due to the fact that when the decoupler is in operation, the rotation of its components generate centrifugal force which tends to push grease out the decoupler. Due to the position of the containment wall 23 forming a barrier at one end of the central portion 22 of the pulley, the grease is contained within the volume surrounding torsion spring 3.

An inner surface of the pulley 2 has a stop (not shown), which contacts the first end of the torsion spring 3 when the pulley rotates, transferring torque to the torsion spring 3. Thus, since the second end of the torsion spring 3 is operatively coupled to the second hub piece 6, the pulley 2 transmits its rotating torque to the torsion spring 3, which will, in turn, transmit this torque to the second hub piece 6, and consequently to the shaft 7, as will be explained later.

As the transmission of torque between the pulley 2 and the torsion spring 3 is by means of a stop applying torque to the first end of torsion spring 3, there is no need for friction engagement between the torsion spring and the pulley. Thus, the inner surface of the central portion 22 of the pulley 2 need not have a high hardness and strength. Consequently, the pulley need not be made of wear resistant and heavy materials, such as steel or other metals, and does not need to be subjected to surface heat treatment. Thus, the pulley can be made of lightweight and cheaper materials that may be less wear resistant such as aluminum or polymers.

As mentioned previously and as can be seen in the schematic illustration of the decoupler according to the invention in FIG. 2A, the clutch spring 5 is located between the inside of hub first and second pieces 4, 6 and shaft 7, inside the torsion spring 3, instead of being arranged next to the inner race of the pulley 2, as in the state of the art. Because of this arrangement used the decoupler according to the present invention, torsion spring 3 can be larger and the diameter is limited only by the inner race of the central portion 22 of the pulley. Torsion springs of larger diameter more efficiently perform the function of damping the torsional vibrations of the engine and are subject to lower levels of stress for a given load, which is one of the advantages of the invention compared to the prior art.

The pulley also has a second portion 24 which has an inner diameter compatible with the diameter of the bearing 8 so as to be press fit or mounted by other suitable means, allowing relative rotational movement between the pulley 2 and the shaft 7.

The axle hub 30 of the decoupler is set between the inner race of the pulley 2 and the outer surface of the shaft 7, and inside the torsion spring 3. The axle hub 30 is provided with a first hub piece 4 and a separate second hub piece 6, being arranged with a gap between them.

The first hub piece 4 is mounted to convey torque to the shaft 7. This first hub piece 4 has a section 41 with a smaller inner diameter, which is fitted by interference or by other means appropriate to the shaft 7, and a portion 42 with larger internal diameter, forming a sort of cavity, in which is housed a portion of the clutch spring 5, which will be better described later.

The second hub piece 6 is mounted around the shaft 7 and can rotate relative to it and may include a journal element on the shaft, such as a bushing 1. This second hub piece 6, that in this embodiment is arranged in the end close to the coupling with the alternator, has a first region 61 of larger internal diameter and a second region 62 of smaller internal diameter, thereby forming a kind of cavity in which is housed a portion of the clutch spring 5 in the region of larger internal diameter 61. The hub pieces 4, 6 are arranged in such a way in the decoupler so that the cavities formed in the second hub piece 6 and the first hub piece 4 are contiguous to one another, forming a single cavity for housing the clutch spring 5. Therefore, the inner surfaces of the first hub piece 4 and the second hub piece 6, at least in their regions of larger diameter 42, 61 which house the clutch spring 5 must be made of a material with high hardness to withstand abrasive friction with clutch spring 5. Preferably these surfaces are made of heat treated steel.

Additionally, the transition zones in the regions of larger diameter 42, 61 to the regions of smaller diameter 41, 62 of the first hub piece 4 and the second hub piece 6 form containment walls 43, 63 of the cavity housing the clutch spring, and effectively contain grease leakage caused by centrifugal force, similar to that explained previously with respect to the torsion spring 3. Due to the layout of the containment walls 43, 63, grease thrown centrifugal outwards runs into these containment walls 43, 63 and is stored within the cavity containing the clutch spring 5.

Figure 7A:
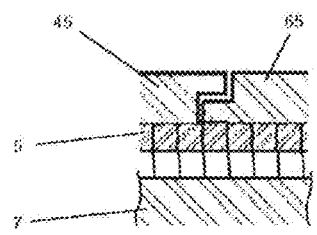
FIGS. 7A. 7B, and 7C—are cross sectional views of three methods of reducing the clearance between the first and second hub components according to the invention to prevent grease leakage from inside the One-way Clutch subsystem.
Figure 7B:
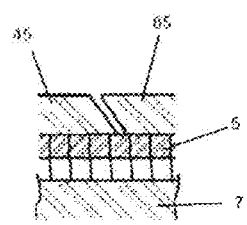

Moreover, as can be seen in FIGS. 2A, 7A, 7B, and 8A, the first and the second hub pieces 4, 6 are arranged within the decoupler with a small gap of distance "e" between them, so that the two hub pieces 4, 6 can rotate with respect to one another. The first and second hub pieces 4, 6 each have in their respective sides 45, 65 that face the gap, features that serve to prevent grease leakage due to centrifugal force. FIGS. 7A and 7B show two versions of coupling ends 45, 65 of hub pieces 4 and 6. In the embodiment shown in FIG. 7A, the end 45 of one of the pieces has a transverse section in an L shape, and the other end piece 65 has a cross section shaped like an inverted L, so that the two ends fit together. This configuration provides a labyrinthine geometry, helping to reduce grease leakage. In FIG. 7B, the edge 45 of the first hub piece is slanted at an acute angle and the edge 65 of the other hub piece is also slanted, forming an obtuse angle with the inner surface complementary to the angle of the edge 45 first piece so that the two ends also fit. In any of the embodiments of the invention, a seal for sealing may be further disposed between the two hub pieces 4, 6 of the axle hub.

Figure 7C:
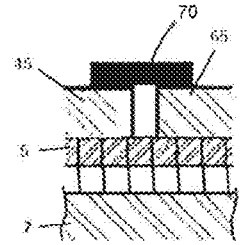

FIG. 7C shows an embodiment of the invention wherein a retainer 70 is arranged in the space between the hub pieces 4, 6. The retainer 70 works as a seal preventing leakage of lubricant through this space, rendering the free-wheel system tighter. In the second embodiment shown in FIG. 7C, the retainer shows a T-shape cross-section wherein the vertical member is set in the space between the first and the second hub pieces 4, 6 and the horizontal member extends over the external race of the first and the second hub pieces 4, 6 circumferentially sealing all the space between the hub pieces. The retainer may be made, e.g., of Teflon or another suitable material to exert function of sealing. If the retainer 70 is applied to an embodiment of the invention that uses the fail-safe system as described above, it will preferably be made of a material that, if compressed, does not prevent the locking between the first and the second hub pieces 4, 6. The second hub piece 6 also has a radial wall 64 that extends radially outwardly toward the inner race of the pulley 2, in the space formed between the torsion spring 3 and the bearing 8. The second hub piece 6 also has a stop (not shown) on its axial face, against which runs into the second end of the torsion spring 3 when the pulley 2 rotates. By means of the coupling between the torsion spring 3 and the stop, there is torque transmission from the torsion spring 3 to the second hub piece 6, which integrates the free wheel system of the decoupler, and which transmits torque to the shaft 7, thereby causing rotational movement of the shaft 7. As explained previously, the torque applied to the torsion spring 3 is derived from the rotary movement of the pulley 2 and its coupling with the first end of the torsion spring 3.

The rotary motion of the hub pieces 6, 4 cause frictional engagement of the clutch spring 5 with the inner races of the hub pieces 6, 4, thereby transmitting torque to the axle 7 in the same direction of rotation with the axle hub 30 and pulley, or by allowing decoupling between the shaft and the pulley. In the decoupled condition between the shaft and pulley, the decoupler operates as a free wheel system, allowing the shaft 7 to rotate in a different direction from axle hub 30 and pulley 2, or by allowing the shaft 7 to rotate in the same direction but at a different, higher speed than the pulley (overrunning).

The shaft 7 driveable by the pulley 2 already described herein has a first end region 71 of larger outer diameter, which is mounted by press fitting or by other appropriate means, onto the smaller internal diameter portion 41 of the first hub piece 4. The shaft 7 has also a second end region 73 of larger external diameter, on which one of the bearing elements, preferably bearing 8, is mounted. In this embodiment of the invention, the bearing is set in the axle end opposed to the coupling with the alternator. The central portion 72 of the shaft 7 has a smaller outer diameter than the first and second end region 71, 73 and corresponds to the location of the clutch spring 5. Thus, the central region defines, together with the cavities formed in the first hub piece 4 and the second hub piece 6, a housing for the clutch spring 5. In the embodiment of the invention in which the decoupler is used to drive an alternator, the shaft 7 has an internal thread at one end for attachment to the alternator shaft, and a splined profile on its internal surface opposite the threaded end so that the assembly can be affixed to the alternator pulley using a special tool.

In a preferred embodiment of the invention, the decoupler further includes a washer 11 which is attached at one end to provide sealing against leakage of grease, prevent external contamination and provide a better finish for the assembly.

Figure 1B:
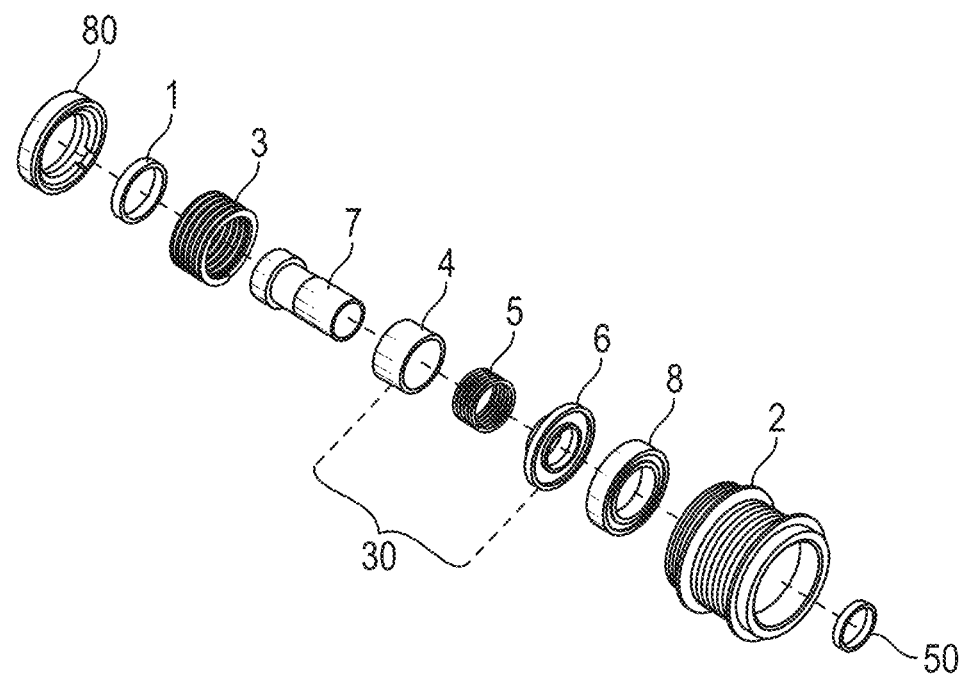
FIG. 1B—is an exploded view of the components of the decoupler according to a second embodiment of the invention.
Figure 2B:
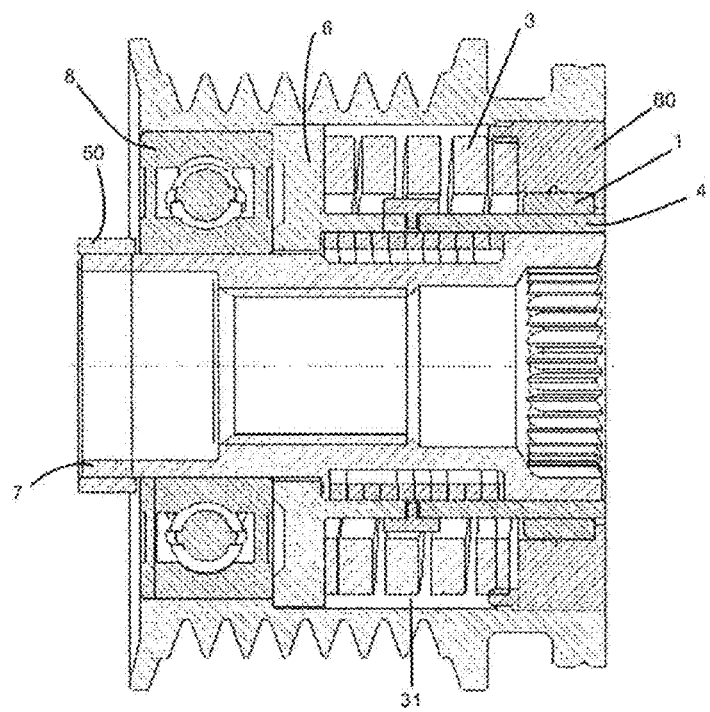
FIG. 2B—is a cross-sectional view of the decoupler shown in FIG. 1B in an assembled state.
Figure 14A:
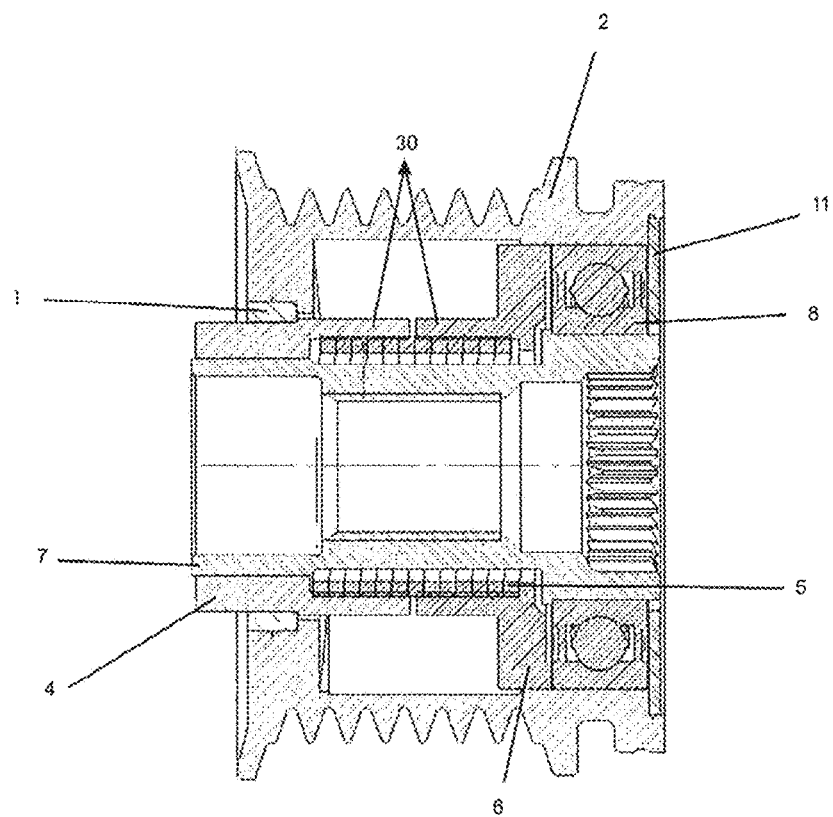
FIG. 14A—is a cross section view of the decoupler in accordance with the embodiment of FIG. 1A showing the one-way clutch without the torsion spring and with a lock between the hub and the pulley.
Figure 14B:
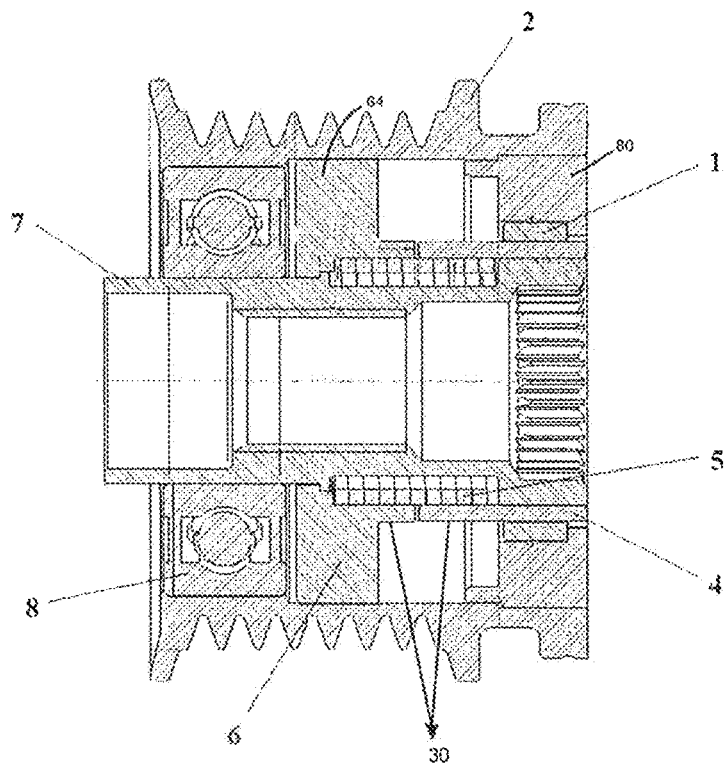
FIG. 14B—is a cross section view of the decoupler in accordance with the embodiment of FIG. 1B showing the one-way clutch without the torsion spring and with a lock between the hub and the pulley.

FIGS. 1B, 2B, and 14B illustrate an alternative second embodiment of the invention. In this embodiment, the bearing 8 is mounted on the axle side near to the end for coupling with the alternator, while the bushing 1 is used as bearing element on the side opposed to the coupling with the alternator. This invention of the bearing elements relative to the embodiment shown in FIGS. 1A, 2A, and 14A may be advantageous depending on the side of the shaft 7 in which the greater load is applied, once the bearing 8 may withstand higher loads, thus being preferably positioned in the critical section of the pulley. A flange 50 is also mounted on the shaft end 7, next to the bearing 8, with structural means and/or in order to protect the said bearing.

In this embodiment of the invention, the pulley 2 presents a simplified internal geometry, with inner diameter provided only of small variations and without a portion of greater thickness. A bearing ring 80 is used as auxiliary bearing element, being coupled on the shaft and pulley side opposed to the side where the bearing 8 is coupled. The bearing ring 80 is mounted with interference fit to the pulley inner race. A bushing 1 is mounted between the first hub piece 4 and the bearing ring 80, making an interference fit on the bearing ring 80, and being able to rotate relative to the hub piece 4. The bushing 1 is responsible by journaling and centering between the shaft 7, the hub first piece 4 and the pulley 2, and also allows rotational movements between the pulley 2 and the shaft 7. The first shaft piece 4 is coupled rotation proof to the shaft 7.

According this second embodiment of the invention, instead of being formed in the pulley 2 inner race, the stopper that hits and transfers rotational torsion to the first torsion spring end 3 may, alternatively, be formed on the bearing ring 80. As the bearing ring 80 is torsion-proof coupled to the pulley 2 inner race, the pulley 2 rotational movement also causes a rotation in the bearing ring 80, that transfers this movements to the torsion spring 3. In this embodiment of the invention, the positions of the first hub piece 4 and the second hub piece 6 are inverted to each other relative to the embodiment shown in the FIGS. 1A, 2A, and 14A. The first hub piece 4 is arranged next to the coupling side of shaft 7 with the alternator. These modifications do not interfere the functioning of the decoupler according the invention, being the same herein described before for the embodiments shown in FIGS. 1A, 2A, and 14A.

The modifications shown in FIGS. 1B, 2B, and 14B prove the flexibility of assembling the decoupler pieces according to the invention. The flexibility allows the piece assembly to be adjusted due to the placement of the pulley which applies the greater load on the decoupler.

Further, the use of a pulley of more simple internal geometry associated to a bearing ring 80 brings the advantage of making the pulley manufacturing process easier. The internal components assembly is also easier with this pulley geometry modification, as it makes it easier to arrange the pieces in its interior.

Figure 3A:
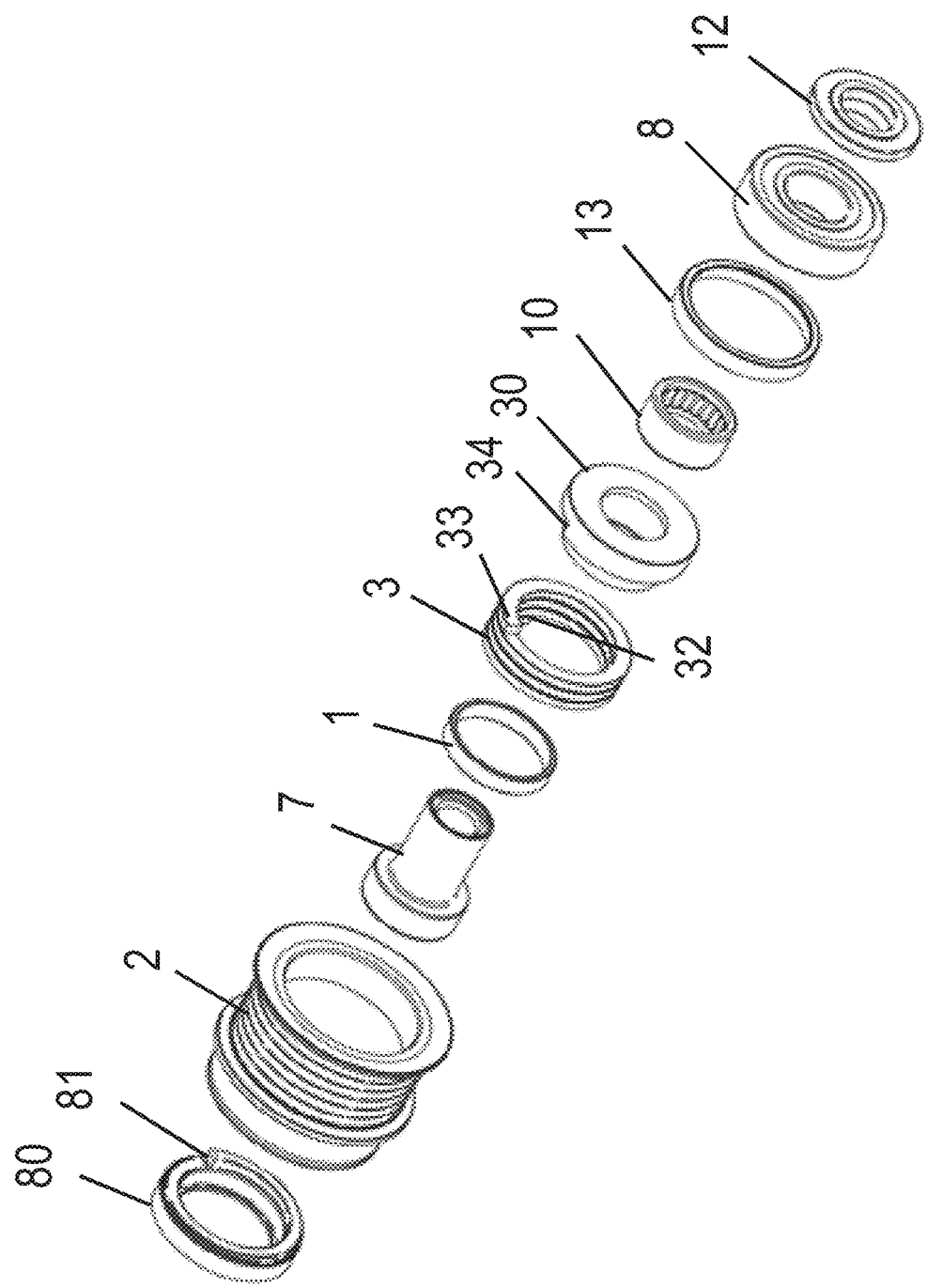
FIG. 3A—is an exploded view of the components of the decoupler according to an embodiment of the invention where the one-way clutch is longitudinally oriented.
Figure 3B:
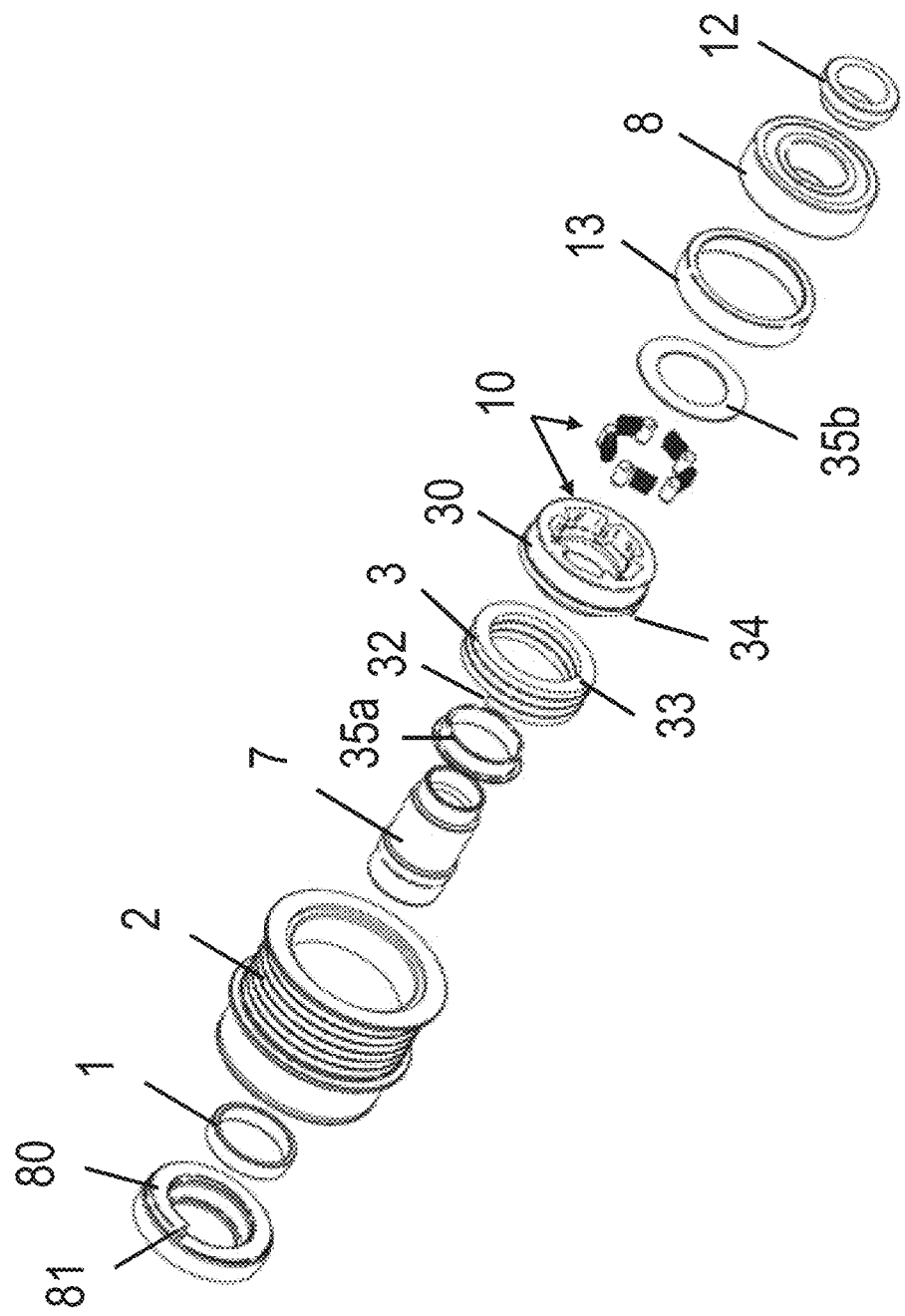
FIG. 3B—is an exploded view of the components of the decoupler according to another embodiment of the invention where the one-way clutch is longitudinally oriented.

Now referring to FIGS. 3A and 3B, exploded views of a decoupler where the one-way clutch 10 is longitudinally oriented are provided herein. Specifically regarding FIG. 3A, the pulley 2 selectively transmits torque to the shaft 7 to allow the shaft 7 to overrun the pulley 2. The pulley 2 defines an inner cavity where other components are located. A front ring 80 is mounted on an inner surface of the pulley using an interference fit and is positioned within the inner cavity. The front ring 80 has a pulley endstop 81 that is operatively engaged to a torsion spring 3. A bearing element, in this case a bushing 1, can be positioned between a mounting surface of the front ring 80 and the shaft 7 to permit rotation of the shaft 7 and to center the shaft 7 relative to the pulley 2. It will be appreciated that in some embodiments, the pulley 2 and the front ring 80 could be formed as a single component.

Next, a torsion spring 3 transmits torque from the pulley 2 and the front ring 80 to a hub 30. The torsion spring 3 has a first endstop 32 that is operatively engaged to the pulley endstop 81 and a second endstop 33 that is operatively engaged to a hub endstop 34. As described elsewhere herein, the axial distance between the pulley endstop 81 and the hub endstop 34 is less than the uncompressed or relaxed length of the torsion spring 3 so that the torsion spring 3 exerts a force on the hub 30. Stated another way, the axial distance between the front ring 80 (or the bushing 1) and the hub 30 is less than the torsion spring 3 in a relaxed state. The hub 30 can have an internal surface with a hardened, heat-treated steel with high strength to reduce wear generated by a one-way clutch.

A one-way clutch 10 is positioned between an inner surface of the hub 30 and an outer surface of the shaft 7. The one-way clutch 10 in this embodiment is a roller clutch that has a plurality of rollers arrayed around the shaft 7. When the one-way clutch 10 rotates in a first direction relative to the shaft 7, the rollers spin freely. As a result, the pulley 2 transmits torque through the front ring 80, the torsion spring 3, the hub 30, and the one-way clutch 10 but not to the shaft 7. This permits the shaft 7 to overrun the pulley 2. When the one-way clutch 10 rotates in a second direction, the rollers lock against the shaft 7. As a result, the pulley 2 transmits torque through the one-way clutch 10 and to the shaft 7.

As depicted in FIG. 3A, another bearing element, in this case a bearing 8, is positioned between the pulley 2 and the shaft 7, and a cover ring 12 is mounted to the end of the bearing 8 to contain the other components within the inner cavity of the pulley 2. A bushing 13 can be positioned in the inner cavity of the pulley 2 to position the hub 30 relative to the bearing 8.

Now referring to FIG. 3B, an exploded view of a decoupler where the one-way clutch 10 is another roller clutch is provided. This embodiment of the decoupler comprises many of the same components of the decoupler described with respect to FIG. 3A. One difference is that the hub 30 and the one-way clutch 10 are largely combined into a single component. Stated alternatively, the hub 30 and the shaft 7 can form the one-way clutch 10. The hub 30 portion comprises the hub endstop 34, and the inner surface of the hub 30 comprises slots that receive rollers of the one-way clutch 10, which are described in more detail below. A first cover ring 35a and a second cover ring 35b are attached to either side of the hub 30 to contain the rollers of the one-way clutch 10. Like the one-way clutch 10 in FIG. 3A, the one-way clutch 10 in FIG. 3B locks in one direction of rotation to transmit torque to the shaft 7 and spins freely in a second direction to allow the shaft 7 to overrun the pulley 2.

Figure 3C:
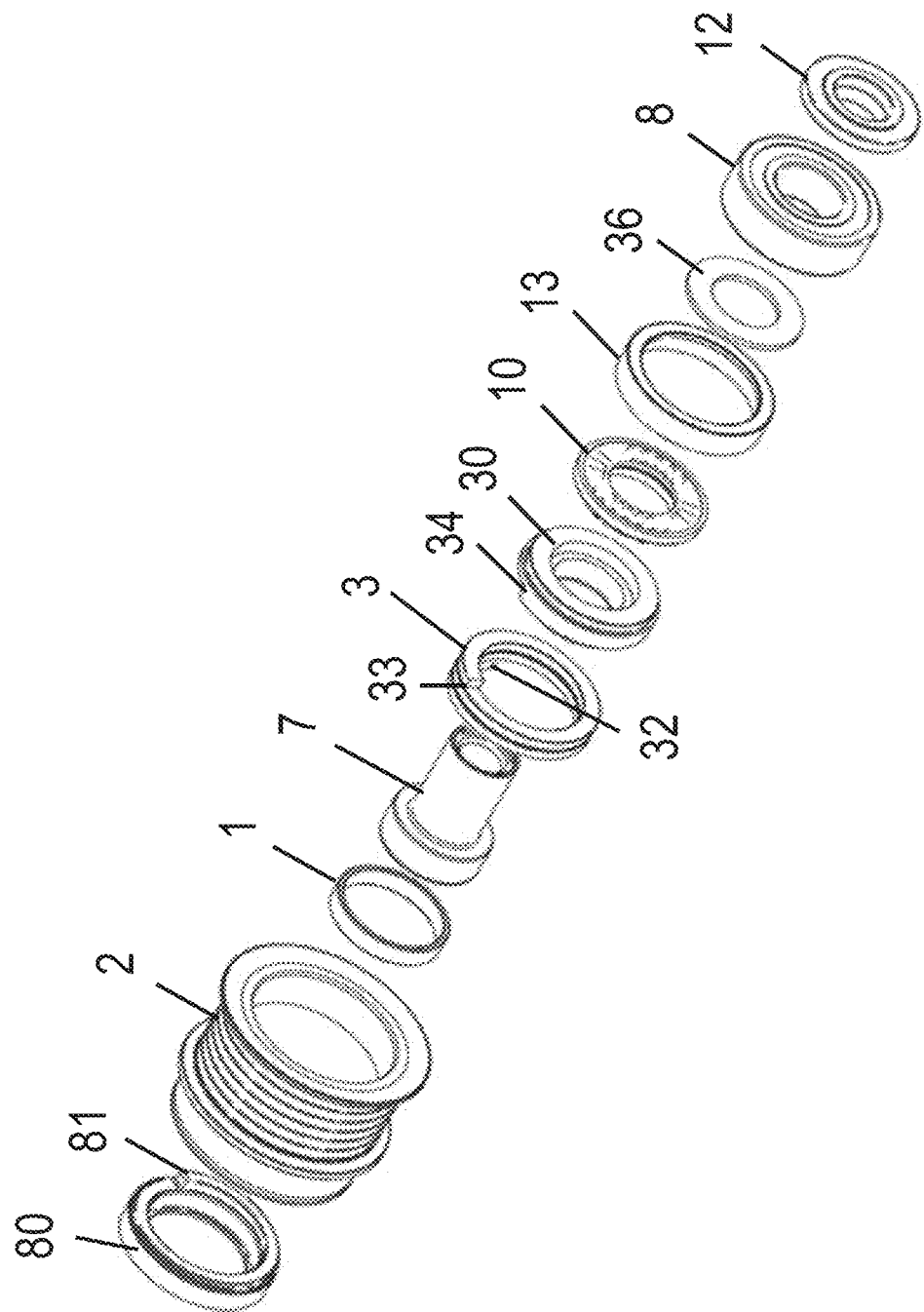
FIG. 3C—is an exploded view of the components of the decoupler according to an embodiment of the invention where the one-way clutch is radially oriented.

Now referring to FIG. 3C, an exploded view of a decoupler where the one-way clutch 10 is oriented in the radial direction is provided. Like the decouplers in FIGS. 3A and 3B, this decoupler has a pulley 2, a front ring 80 mounted to the pulley 2, and a bushing 1 that permits rotation between the front ring 80 and a shaft 7. A pulley endstop 81 on the front ring 80 transmits torque from the pulley to a first endstop 32 on a torsion spring 3. A second endstop 33 on the torsion spring 3 transmits torque to a hub endstop 34 on a hub 3.

However, with the decoupler depicted in FIG. 3C, a radially oriented one-way clutch 10 is interconnected to the hub 3. This one-way clutch 10 has rollers that engage and act against a clutch race 36, which is interconnected to the shaft 7. The rollers freely rotate against the clutch race 36 in a first direction of rotation, but lock against the clutch race 36 in a second direction of rotation to transmit torque to the clutch race 36 and to the shaft 7. The rollers are oriented radially, and stated another way, an axis of rotation for each roller is oriented perpendicular with a longitudinal axis of the pulley 2 and the shaft 7 and/or passes through a longitudinal axis of the pulley 2 and the shaft 7. The hub 30 and the one-way clutch 10 can be formed as a single component and/or the hub 30 and the shaft 7 can form the one-way clutch 10.

Like the decouplers in FIGS. 3A and 3B, the decoupler in FIG. 3C has a bushing 13 that orients and centers some components in the inner cavity of the pulley 2, including the hub 30. A bearing element, in this case a bearing 8, is positioned between the pulley 2 and the shaft 7 to permit rotation between the two components 2, 7, and a cover ring 12 secures components within the inner cavity of the pulley 2.

Figure 4A:
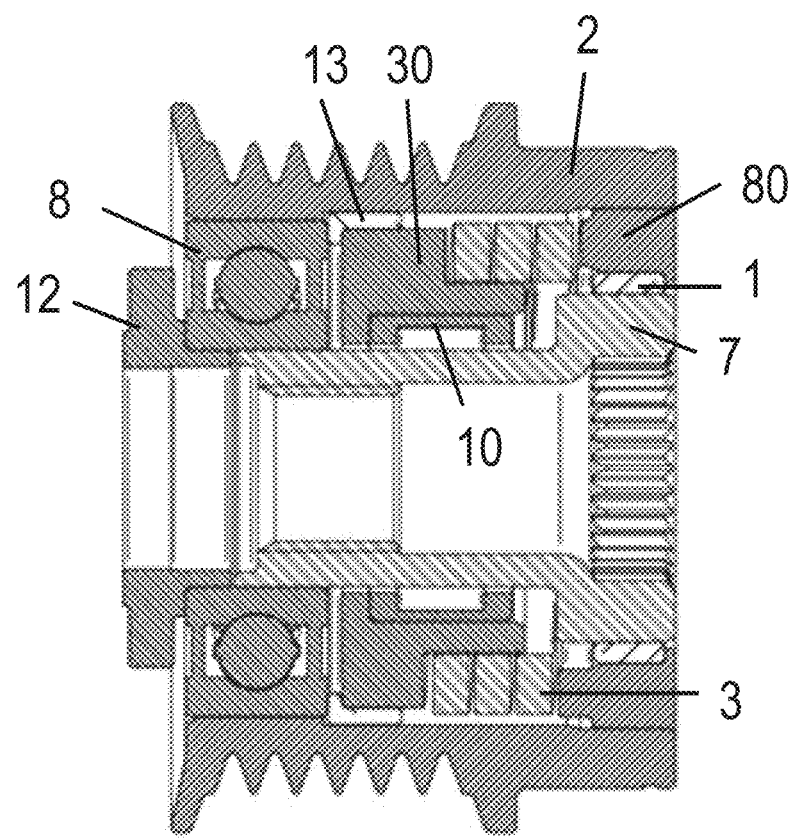
FIG. 4A—is a cross-sectional view of the decoupler shown in FIG. 3A in an assembled state.
Figure 4B:
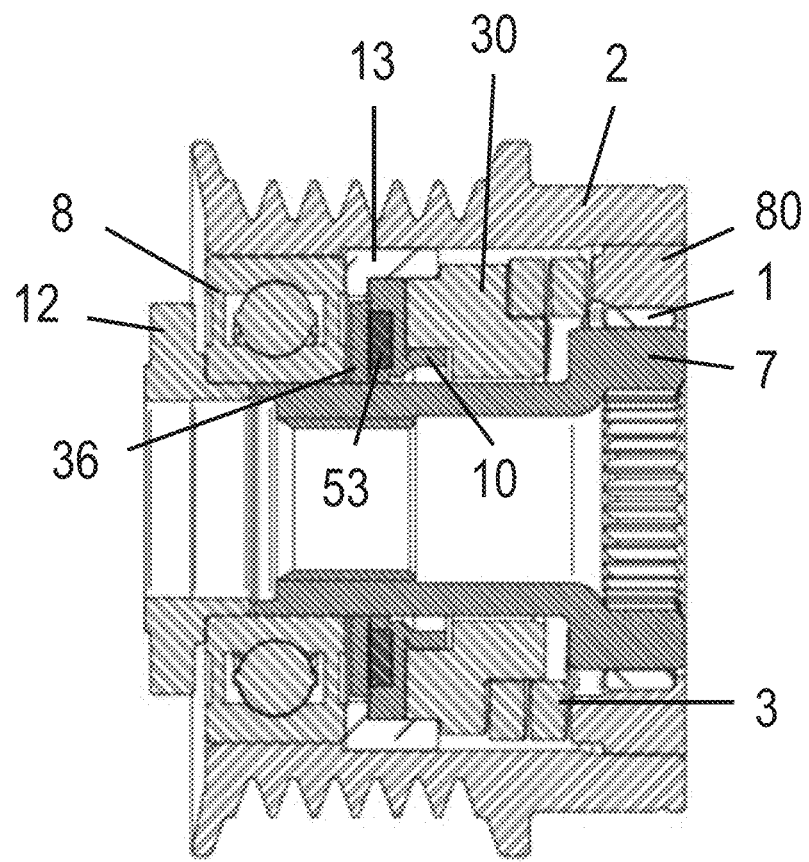
FIG. 4B—is a cross-sectional view of the decoupler shown in FIG. 3C in an assembled state.

FIGS. 4A and 4B show cross-sectional views of decouplers with a longitudinally oriented one-way clutch and a radially oriented one-way clutch, respectively. Specifically, FIG. 4A is a cross-sectional view of the decoupler in FIG. 3A. A drive belt rotates the pulley 2, which transmits torque through the front ring 80, the torsion spring 3, and the hub 30. Then, a one-way clutch 10 selectively transmits torque to a shaft 7, which then, for example, powers an alternator. It will be appreciated that embodiments of the decoupler can vary from the depicted decoupler yet remain within the scope of the present invention. For instance, the bearing 8 and the bushing 1 can be different types of bearing elements. Further, the arrangement of components can be different. As depicted, the bushing 1 serves as a first bearing element, and the bearing 8 serves as a second bearing element. Thus, the hub 30 is positioned between the torsion spring 3 and the second bearing element. Alternatively, the torsion spring 3 can be positioned between the hub 30 and the second bearing element.

Now referring to FIG. 4B, a cross-sectional view of the decoupler in FIG. 3C is provided. This decoupler also has a pulley 2 that transmits torque to the front ring 80, the torsion spring 3, and the hub 30. A one-way clutch 10 is interconnected to the hub 30 and is oriented radially. A clutch race 36 is interconnected to the shaft 7 such that the clutch race 36 rotates with the shaft 7 and transmits torque to the shaft 7. The rollers 53 of the one-way clutch 10 engage the clutch race 36 to selectively transmit torque to the clutch race 36 and the shaft 7. The rollers 53 freely rotate against the clutch race 36 as the one-way clutch 10 rotates in a first direction relative to the shaft 7, and the rollers 53 lock against the clutch race 36 as the one-way clutch 10 rotates in a second direction relative to the shaft 7. It will be appreciated that the clutch race 36 can be a separate component that is joined to the shaft 7 or an extension of the shaft 7. Similarly, the one-way clutch 10 can be a separate component that is interconnected to the hub 30, and can also be integrated with the hub 30.

FIGS. 5A-5D are cross-sectional views of one-way clutches that are oriented in the longitudinal direction of the pulley and shaft. Specifically regarding FIG. 5A, a plurality of rollers 53 are positioned between an inner race 51 and an outer race 52. Each roller 53 resides in a cavity formed between the inner race 51 and the outer race 52, and a spring 54 biases each roller 53 in a clockwise, or first direction 57. The shape of the cavity for each roller 53 tapers along the first direction 57 from a larger diameter to a smaller diameter. Therefore, when the outer race 52 rotates in the first direction 57, the rollers 53 freely rotate, and no torque is transmitted between the races 51, 52. As the outer race 52 rotates in a second direction 58, or counterclockwise in this case, the taper of the cavity causes the rollers 53 to lock, and the races 51, 52 rotate at the same angular speed and torque is transmitted between the races 51, 52. Stated another way, one of the races defines a lock angle between the roller contact region and the opposite race. This eccentric profile or wedge profile in one of the races reduces the space available for the roller, urging the roller to lock against both the eccentric and cylindrical races. It will be appreciated that while six rollers 53 are depicted, embodiments of the present invention can include a greater or fewer number of rollers 53. Similarly, embodiments of the present invention can lock when the outer race 52 rotates in the first direction 57 and freely rotate in the second direction 58.

In various embodiments of the present invention, the shaft can serve as the inner race 51, and the one-way clutch or hub can serve as the outer race 52. Therefore, in an overrunning scenario, the inner race 51 and the outer race 52 can both rotate in the counterclockwise direction, but the inner race 51 or shaft rotates at a faster rate. Thus, the rollers 53 rotate freely, and the shaft is allowed to rotate. If the pulley and one-way clutch begin to rotate faster or the shaft slows down. The rollers 53 lock, and the outer race 52 transmits torque to the inner race 51 such that the pulley is actively powering the shaft and the alternator.

The one-way clutch shown in FIG. 5B is a sprag clutch. This clutch comprises rollers 53 disposed between an inner race 51 and an outer race 52, and also comprises asymmetrically-shaped sprags 55. The shape of the sprag allows for the rotation of the outer race 51 in a first direction 57. However, the shape of the sprag seizes the sprag against the races 51, 52 when the outer race rotates in a second direction 58. As depicted, there are three sprags 55 evenly positioned between twelve rollers 53, but it will be appreciated that embodiments of the present invention can include a greater or fewer number of sprags 55 and rollers 53 in different combinations and orderings.

FIGS. 5C and 5D show cross-sectional views of a sprag clutch that has at least one spring-biased 56 sprag 55. The spring 56 allows for a smoother engagement and disengagement between a free-spinning overrun mode and a locked mode where the pulley is driving the shaft. It will be appreciated that a greater number or all of the sprags 55 may be spring-biased 56.

Figure 15:
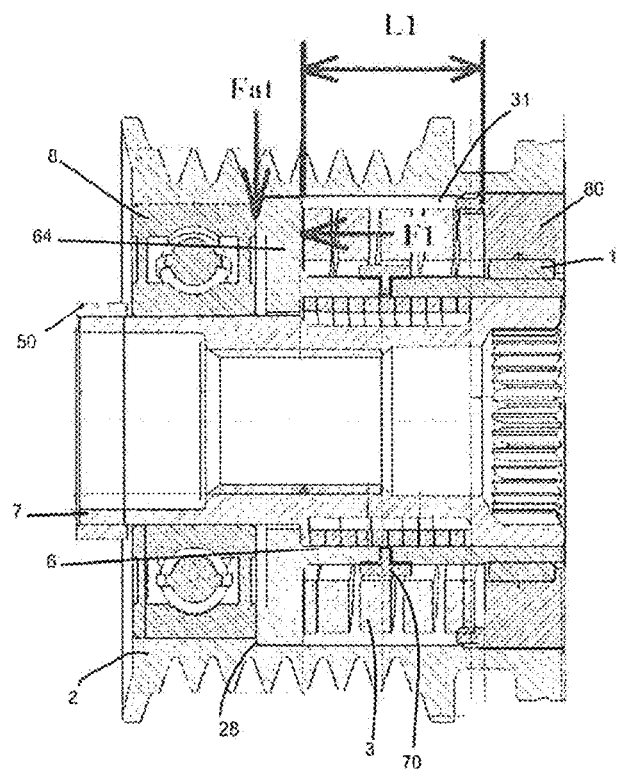
FIG. 15—is a cross section view of the decoupler in accordance with the embodiment of FIG. 1B showing forces exerted by the torsion spring on the axle hub and by the axle hub on the bearing and the pulley due the fit of the torsion spring on the housing cavity, including a friction force that is adjustable depending on the application of the decoupler.

The internal arrangement of the decoupler pieces, according the invention, also allows reduction of the torsional vibration amplitude by means of setting the torsion spring 3 inside its housing cavity 31. FIG. 15 schematically shows how this technical effect occurs in the embodiment of the invention shown in FIGS. 1B and 2B, this effect also being achieved in an equivalent way in the embodiments of the invention shown in FIGS. 1A and 2A.

In order to archive this technical effect, it is necessary that the free length of torsion spring L0 while relaxed be greater than the axial length L1 of the spring housing cavity 31. In this embodiment of the invention, the housing cavity 31 is limited in the axial direction by the bearing ring 80 and by the radial wall 64 of the second hub piece 6.

Thus, when the spring is set inside the cavity 31 is exerts a force F1 in the axial direction on the internal surface of the radial wall 64 of the second hub piece 6. Due to the force F1, the external surface of the radial wall 64 of the second hub piece 6 engages with a bearing element internal face placed at that side of the pulley, in this case, the bearing 8. If the pulley has a portion with reduced internal diameter 24 in the coupling with bearing 8 region, then the second hub piece 6 push by the torsion spring 3 also engages a shoulder 28 formed in the pulley internal race 2 in this reduced diameter portion 24.

As result of the torsion spring 3 compression over the second hub piece 6 with force F1, when a rotation of the second hub piece 6 relative to the pulley occurs, a friction force $F_{at}$ is generated in the radial wall 64 contact region of the second hub piece 6 with the bearing 8 and with a shoulder 28 of the pulley internal race 2. This friction force can be set by adjusting the compression of torsion spring 3 inside the housing cavity 31. The energy dissipation of the decoupler by means of this friction force $F_{at}$ contributes for the reduction of torsional vibrations of the decoupler.

The decoupler according to the invention has a fail-safe system, illustrated in FIGS. 8A to 13D, that allows the decoupler to continue to operate for a certain time interval, upon failure or breakage of the torsion spring or clutch spring. This system comes into operation when the torsion spring or the clutch spring is subjected to sufficient excessive stress to cause breakage of either spring.

Figure 8A:
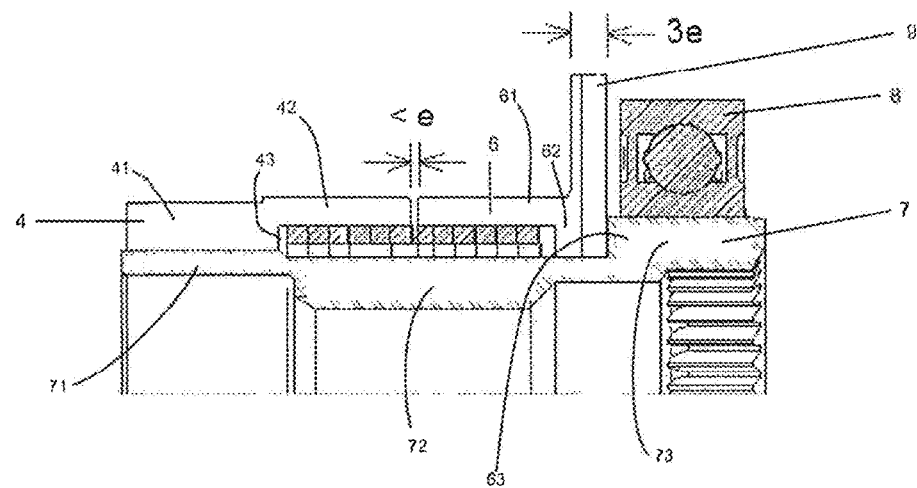
FIG. 8A—is a cross-sectional view of the fail-safe mechanism of the torsion spring and the clutch system of the decoupler, showing the coupling between the first hub piece, the second hub piece and the stop washer in the normal operational condition.
Figure 9A:
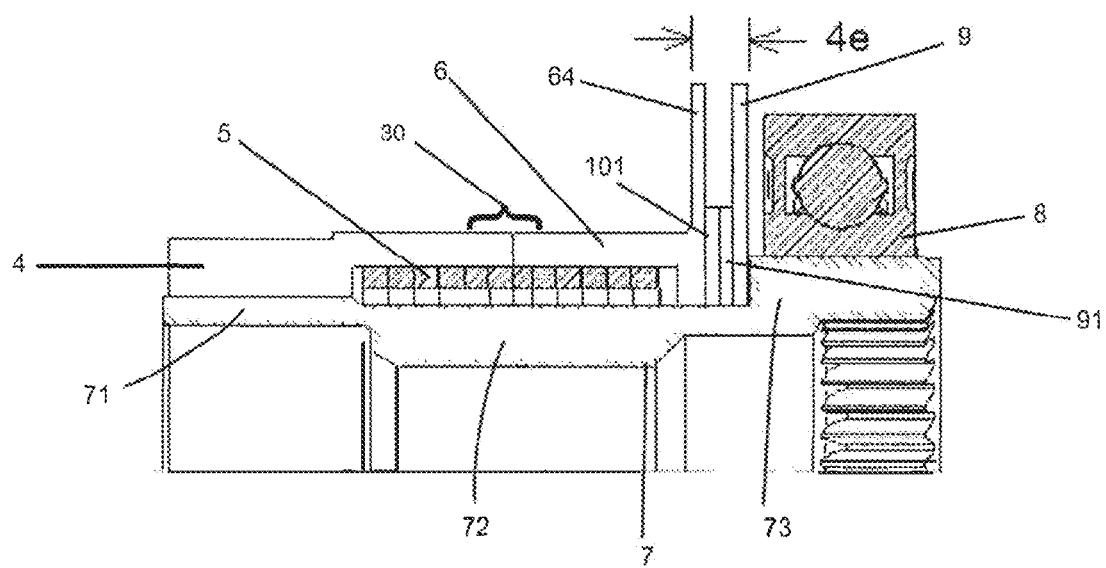
FIG. 9A—is a cross-sectional view of the fail-safe mechanism of the torsion spring and the clutch system of the decoupler showing the coupling between the first hub piece, the second hub piece and the stop washer operating in the fail-safe mode.

According to this embodiment of the invention, the decoupler has a stop washer 9 disposed between the radial wall 64 of the second hub piece 6 and the bearing 8 and which extends in the radial direction toward the pulley 2. The washer is press fit on the shaft 7 or to the inner surface of the pulley 2 inside housing cavity 31, preferably in the central region 72 of smaller outer diameter, as can be seen in FIGS. 8A and 9A.

Figure 12:
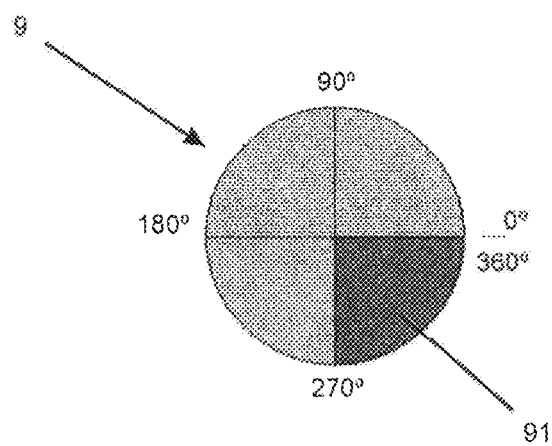
FIG. 12—shows the face of the stop washer in contact with the wall of the second hub piece, for operation in the fail-safe mode.

The washer 9 comprises a circular shape with flat sides and a thickness "e". The washer also has a shoulder 91 in a portion of the face that is in contact with the radial wall 64 of the second hub piece 6. FIG. 12 shows the geometry of the face of washer 9 in contact with the radial wall 64, and the shoulder 91 in accordance with a preferred embodiment of the invention. In this design, the washer has a raised portion in one quadrant of its surface, constituting shoulder 91. The elevation has a thickness "e" in relation to the rest of its surface, and corresponds to an angular region of 90°. This thickness "e" has the same value as the gap between the first and second hub pieces 4, 6. In the region of the shoulder 91, the washer 9 has a thickness of "2e" which can be better seen in FIGS. 10A-10D.

Figure 10A:
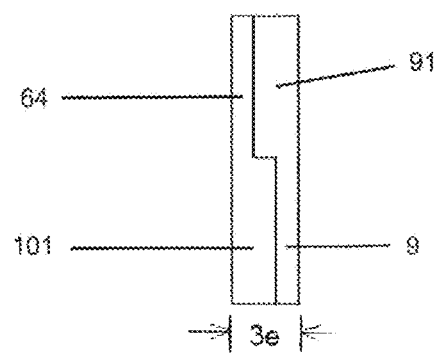
FIGS. 10A and 10B—are the detailed cross sections of the coupling between the second hub piece and the stop washer in the normal and fail-safe modes, respectively.

The wall 64 of the second hub piece 6 also has a circular shape with flat sides, a thickness "e", and a ledge on one radial face that is in contact with the washer 9. FIG. 11 shows the geometry of the face of the radial wall 64 of the second hub piece 6 which makes contact with the washer, and the cam arrangement 101 in accordance with a preferred embodiment of the invention FIG. 11 shows that the wall 64 is formed with a raised portion corresponding to ¼ of its surface, forming a shoulder 101. The shoulder 101 has a thickness "e" in relation to the rest of its surface, and corresponds to an angular region of 90°. Therefore, in the region of the shoulder 101, the wall 64 has a thickness of "2e" which also can be better seen in FIGS. 10A-10D.

In this embodiment of the invention, the shoulders 91 and 101 of the washer 9 and wall 64 represent one quadrant of each of the respective circular surfaces, however, in other embodiments of the invention, these cams can take on other sizes, just so they enable the two pieces to be placed adjacent to each other without the shoulders overlapping.

In normal operation, the washer 9 and the second hub piece 6 are aligned such that the shoulder 91 of the washer 9 is rotated so as not to line up with the shoulder 101 of the wall 64 of the second hub piece 6. That is, the shoulder 91 of the washer 9 lines up with the recessed region in wall 64 of the second hub piece 6, while the shoulder 101 of the wall 64 of the second hub piece 6 is lined up with the recessed region of washer 9, as can be seen in FIGS. 8A and 10A. Thus, the total axial length of the two parts, washer 9 and the second hub piece 6, has a total thickness "3e" as shown in FIG. 8A. In this arrangement and during normal operation of the decoupler, the second hub piece 6 and the first hub piece 4 are disposed with the gap spacing "e" between them, and can rotate freely relative to one another, as can also be seen in FIG. 8A.

Figure 10B:
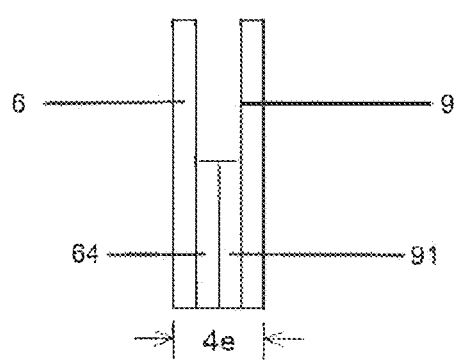
Figure 10C:
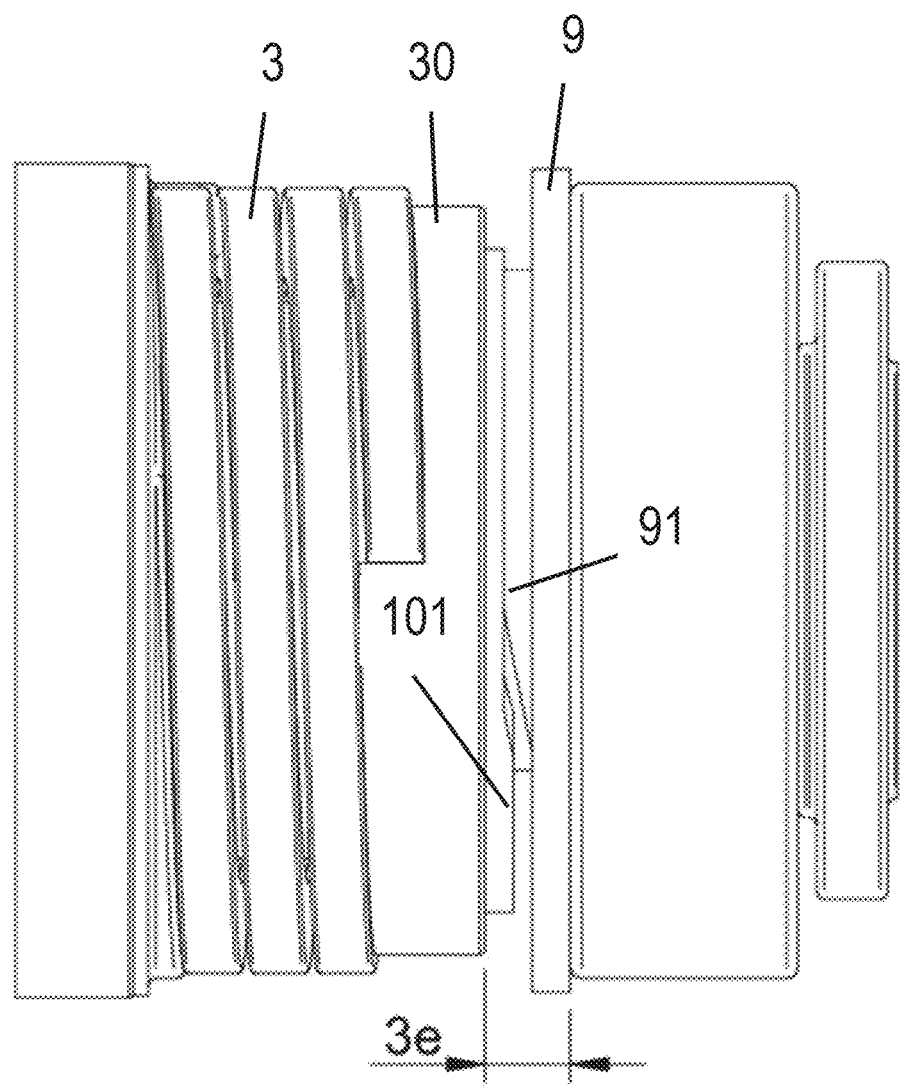
FIGS. 10C and 10D—are the detailed cross sections of the coupling between the hub and the stop washer, which is mounted to the pulley, in the normal and fail-safe modes, respectively.
Figure 10D:
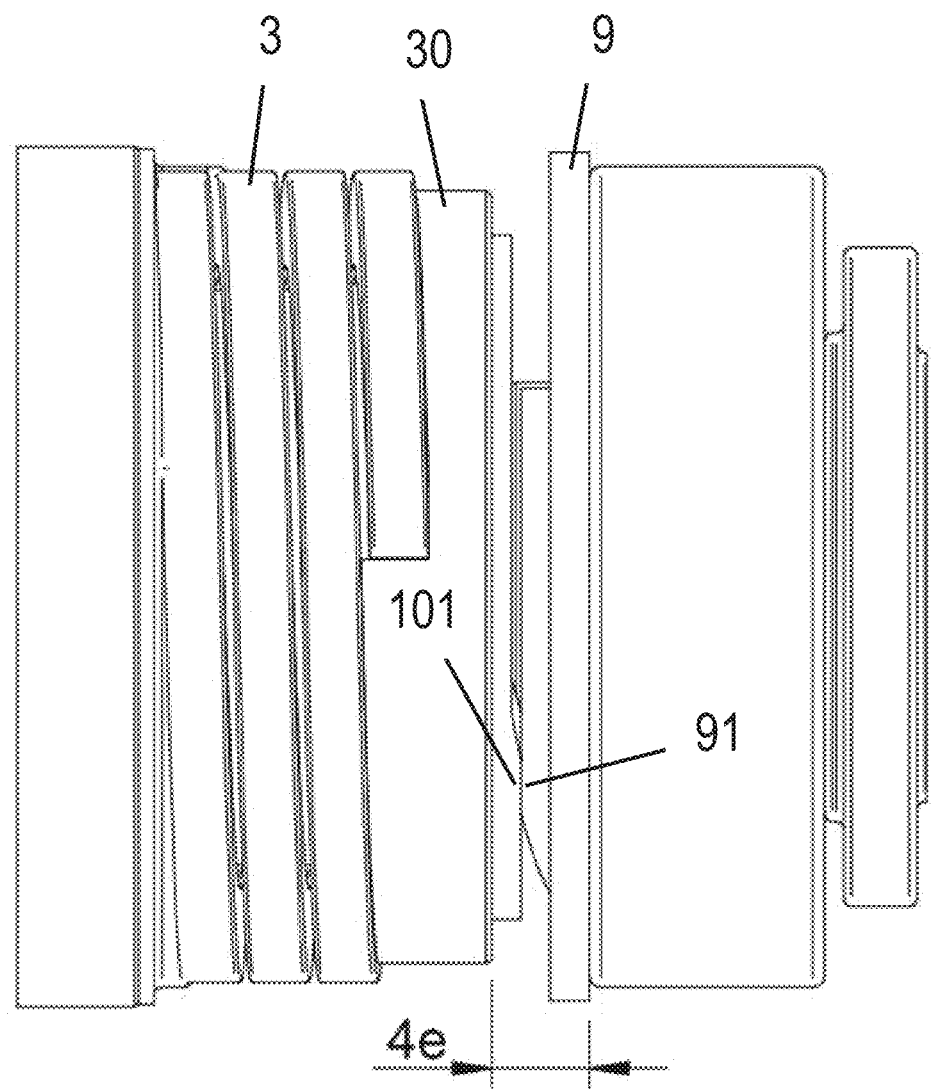
Figure 11:
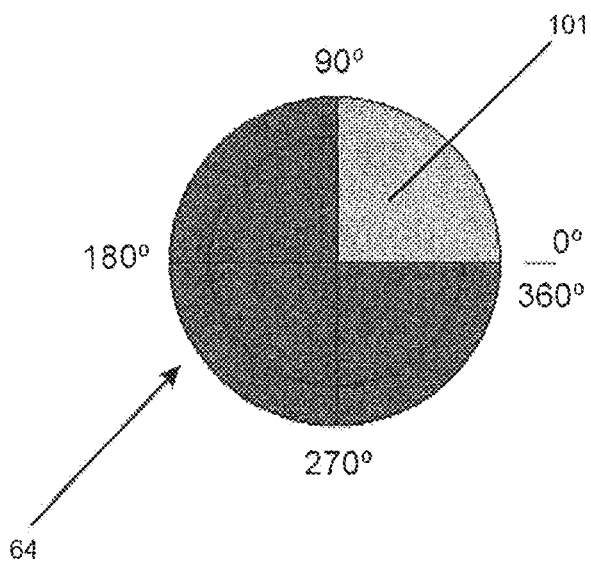
FIG. 11—shows the wall face of the second hub piece with the hub shoulder for operation in the fail-safe mode.

However, in the event of an overload applied to the torsion spring and consequently the second piece hub 6, these parts are induced to rotate more than the torsion spring 3 would allow, or more than 270°, causing the shoulder 101 of the wall 64 of the second hub piece 6 to line up with the shoulder 91, as shown in FIGS. 9A and 10B It will be appreciated that while an exemplary angle of 270° is provided, the angle may be any angle between 0° and 360°. In this case, the decoupler will operate in the fail-safe mode and the assembly of washer 9 and the wall 64 of the second hub piece will have a total thickness of "4e". In this arrangement, the second hub piece 6 is pushed back by a distance "e", thus eliminating the clearance between the second hub piece 6 and the first hub piece 4 as shown in FIG. 9A. Consequently, the second hub piece 6 and the first hub piece 4 are forced into contact with each other, thus causing the first and second hub pieces 4, 6 to lock together, and therefore to axle 7 which is solidly connected to the first hub piece 4. In this case, the decoupler temporarily operates as a solid pulley, transferring rotational movement to the axle 7, until it can be replaced. In applications in which the decoupler is used in a motor vehicle, the rigid decoupler pulley continues to function, allowing the alternator to continue being loaded, preventing the vehicle from stopping because of discharge of the battery.

Figure 8B:
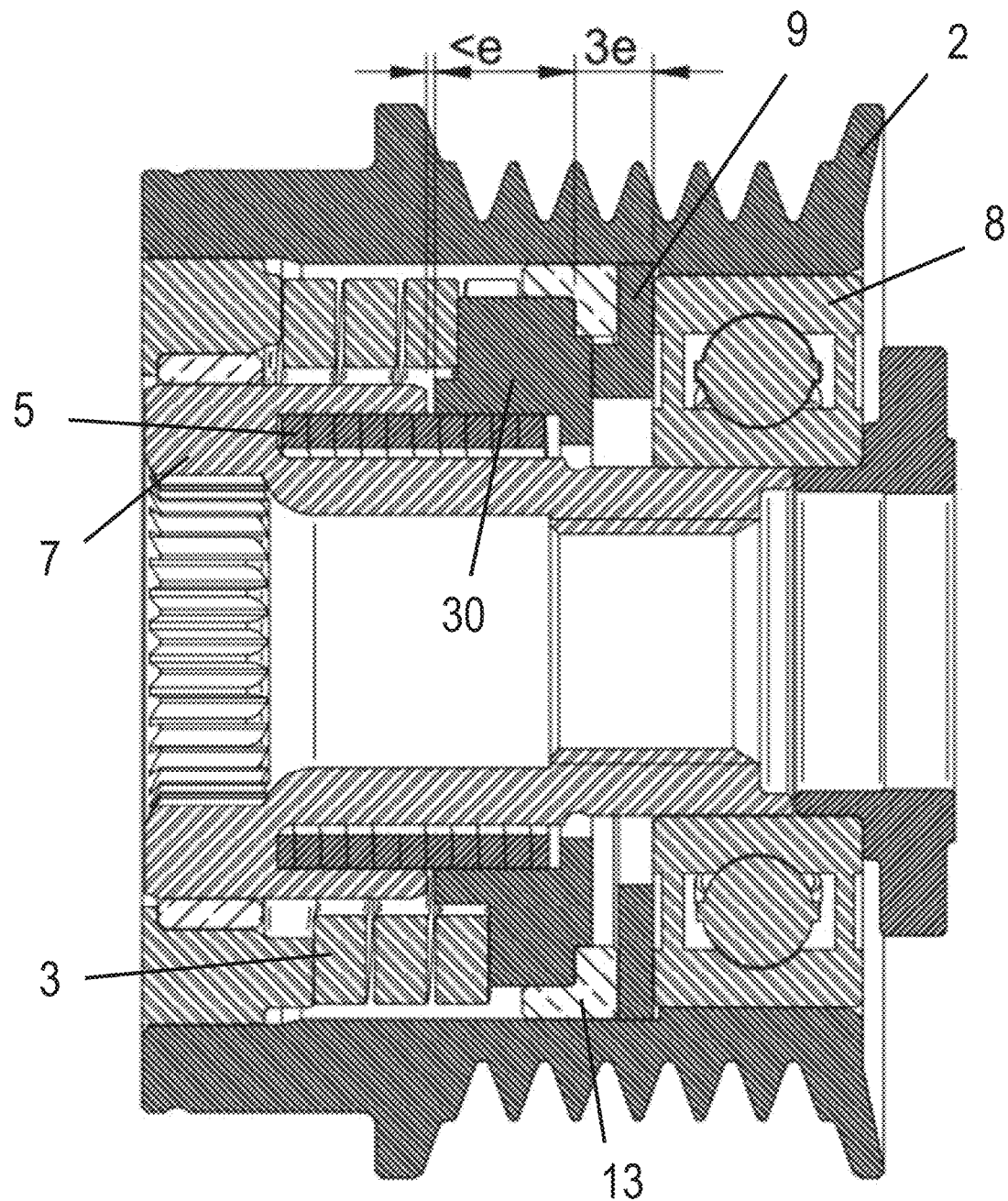
FIG. 8B—is a cross-sectional view of the fail-safe mechanism of the torsion spring and the clutch system of the decoupler, showing the coupling between the hub and the stop washer, which is mounted to the pulley, in the normal operational condition.
Figure 9B:
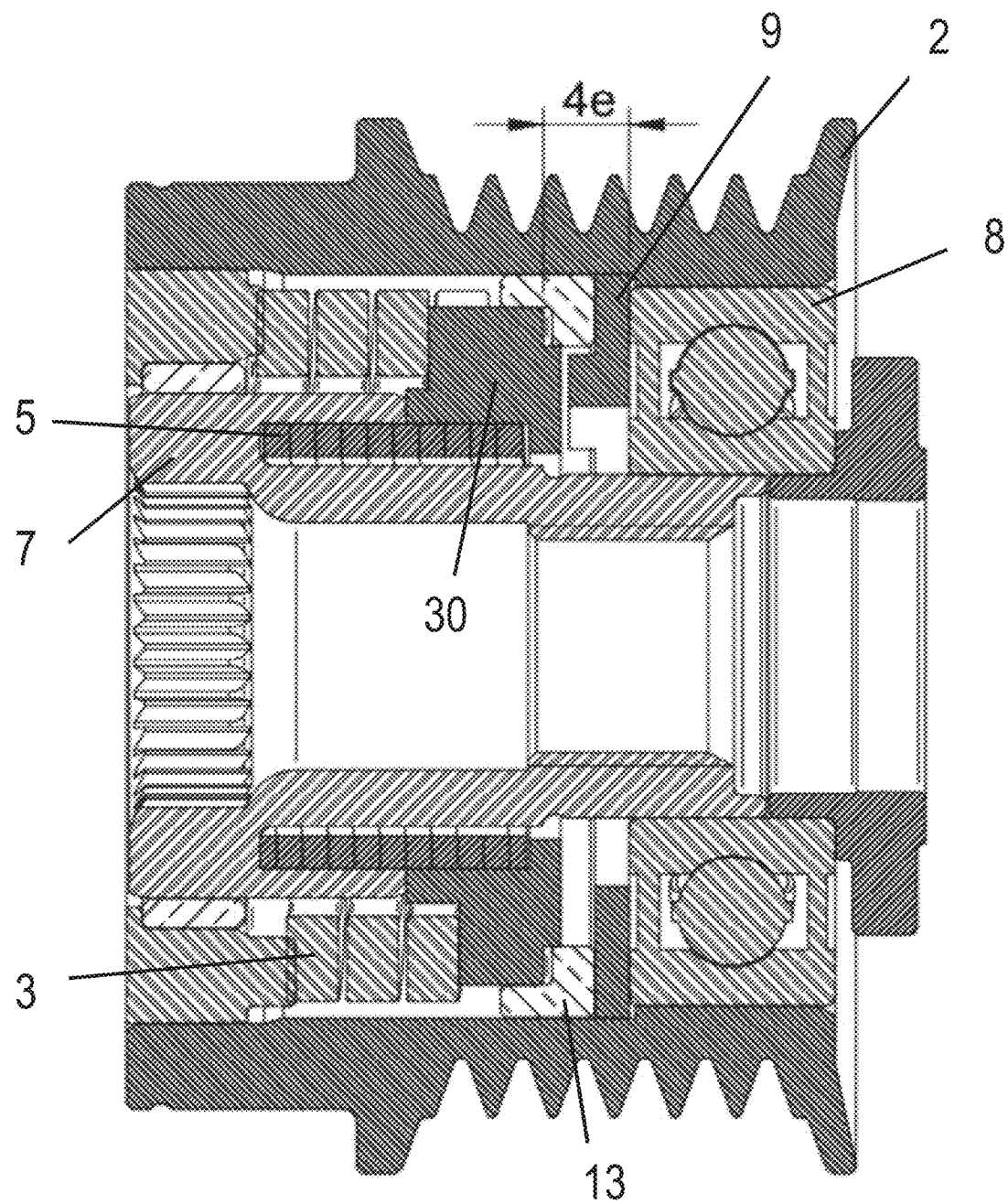
FIG. 9B—is a cross-sectional view of the fail-safe mechanism of the torsion spring and the clutch system of the decoupler showing the coupling between the hub and the stop washer, which is mounted to the pulley, operating in the fail-safe mode.

FIGS. 8B and 9B show a further embodiment of the present invention where the washer 9 is interconnected or mounted to the interior surface of the pulley 2. Like the embodiment in FIGS. 8A and 9A, the embodiment in FIGS. 8B and 9B comprises a bearing 8 between a shaft 7 and the pulley 2, a hub 30 rotatably disposed about the shaft 7, a clutch spring 5 that selectively interconnects the hub 30 to the shaft 7, a torsion spring 3 that operatively interconnects the hub 30 to the pulley 2, and a bushing 13 that maintains the position of the hub 30 within the cavity of the pulley 2. The pulley 2, torsion spring 3, hub 30, and washer 9 rotate together as a belt drives the pulley, the shoulders of the washer 9 and hub 30 stay within a rotational range during operation such that the hub 30 rotates freely with respect to the shaft 7. As shown in FIG. 9B, in the event of a failure and the hub 30 rotates out of this operational range, the shoulders of the washer 9 and hub 30 drive against each other, and the hub 30 is displaced in the axial direction. The axial displacement causes the hub 30 to lock against the shaft 7 in a fail-safe mode.

Figure 13A:
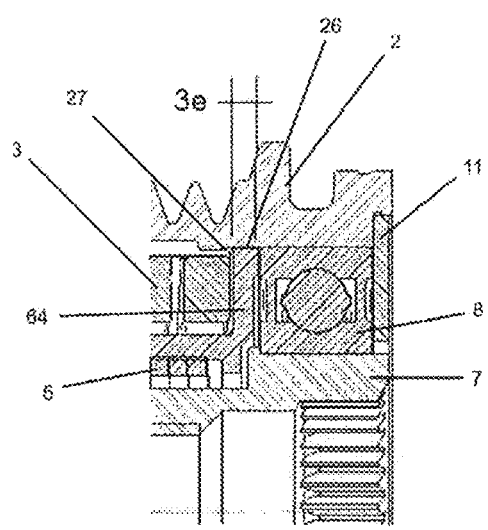
FIGS. 13A and 13B—are the detailed cross section views of the arrangement of the second hub piece and the stop plate relative to the pulley in normal operation and fail-safe mode respectively, showing the locking between the pulley and the second hub piece.

The fail-safe system of the present invention may optionally provide lock up between the second hub piece 6 and the pulley 2, so that the decoupler may operate as a rigid pulley in case of failure or breakage of the torsion spring 3. For this purpose, the inner race of the pulley 2 has a recess 26 in the region between the cavity 31 of the torsion spring and the bearing 8 within which are located washer 9 and the wall 64 of the second hub piece 6, as can be seen in FIG. 13A. When the washer 9 and the wall 64 of the second hub piece 6 are positioned in the normal operating mode, with a total thickness "3e", the second hub piece 6 can freely rotate within the recess 26.

Figure 13B:
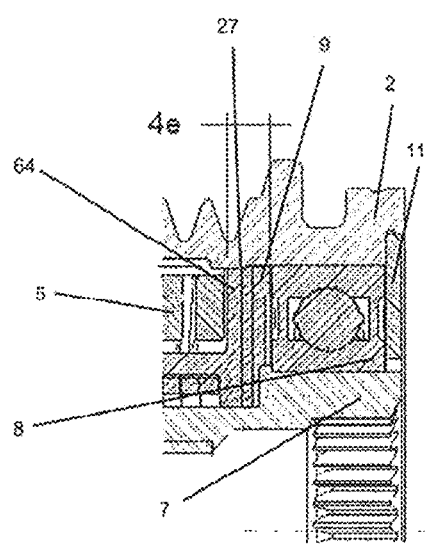

However, when the decoupler operates in the fail-safe mode, the washer 9 and the wall 64 of the second hub piece 6 are engaged because of the overlap between the shoulders 91 and 101, with a total thickness of "4e", and lock up occurs with the second hub piece 6 in the recess 26 as shown in FIG. 13B, so that the second hub piece 6 cannot rotate relative to the pulley 2. Whereas in this fail-safe mode, the shaft 7 is locked relative to the first hub piece 4, and the second hub piece 6 is locked with respect to the pulley 2, then the shaft 7 also becomes locked with respect to the pulley 2, effectively making the pulley rigid.

According to a preferred embodiment of the invention, to enable such locking from the second hub piece 6 and the pulley 2, the recess 26 has an internal stop (not shown) which runs into or interferes with the wall 64 of the second hub piece 6, locking it rotationally only when the shoulder 91 of the washer 9 overlaps the shoulder 101 of the second hub piece 6, and the washer 9 and the wall 64 of the second hub piece 6 assume a total thickness of "4e".

The fail-safe system described herein may be used in any type decoupler with free wheel system, simply by including a pulley 2, engaging a shaft 7, hub pieces 30 coupled between inner race of the pulley 2 and the outer surface of shaft 7 having a first hub piece 4 that is rotationally locked on the shaft 7 and a second hub piece 6 mounted around the shaft 7 and can rotate relatively to it, and having a radial wall 64 extending outward to the inner race of the pulley 2. The first and second hub pieces 4, 6 should be arranged with a gap between them. The decoupler also must possess at least one journal element between the shaft 7 and the pulley 2, and a spring friction clutch 5 attachable to the hub pieces 30 for transmission of torque to the shaft 7.

In addition to these essential characteristics, the decoupler fail-safe system according to the invention should comprise the washer 9 press fit onto the shaft 7 and extending radially within the pulley 2, contacting with a face of the wall 64 of the second hub piece 6. The washer 9 must have a shoulder 91 on its face in contact with the wall 64, and the wall 64 must have a shoulder 101 at its face in contact with the washer 9. Normally, the washer 9 and wall 64 will be positioned with the shoulder 91 of washer 9 rotated so that it fits into the recess of wall 64. When an overload is applied to the second hub piece 6, the shoulder 91 of the washer 9 overlaps the shoulder 101 of the wall 64, so that the second hub piece 6 is shifted axially toward the first hub piece 4, and the first and second hub pieces 4, 6 are locked by contact between them.

In a preferred embodiment this decoupler with fail-safe system, the shoulder 91 of the washer 9 and the shoulder 101 of wall 64 will each have a thickness "e" equal to the gap between the second hub piece 6 and the first hub piece 4. Additionally, the inner race of the pulley 2 has a recess 26 in the region of contact with the wall 64 of the second hub piece 6 and washer 9, the recess having an internal stop, which can contact the radial wall 64, the second hub piece 6 preventing rotation relative to the pulley 2, only when the shoulder 91 rotates to overlap the shoulder 101.

Figure 13C:
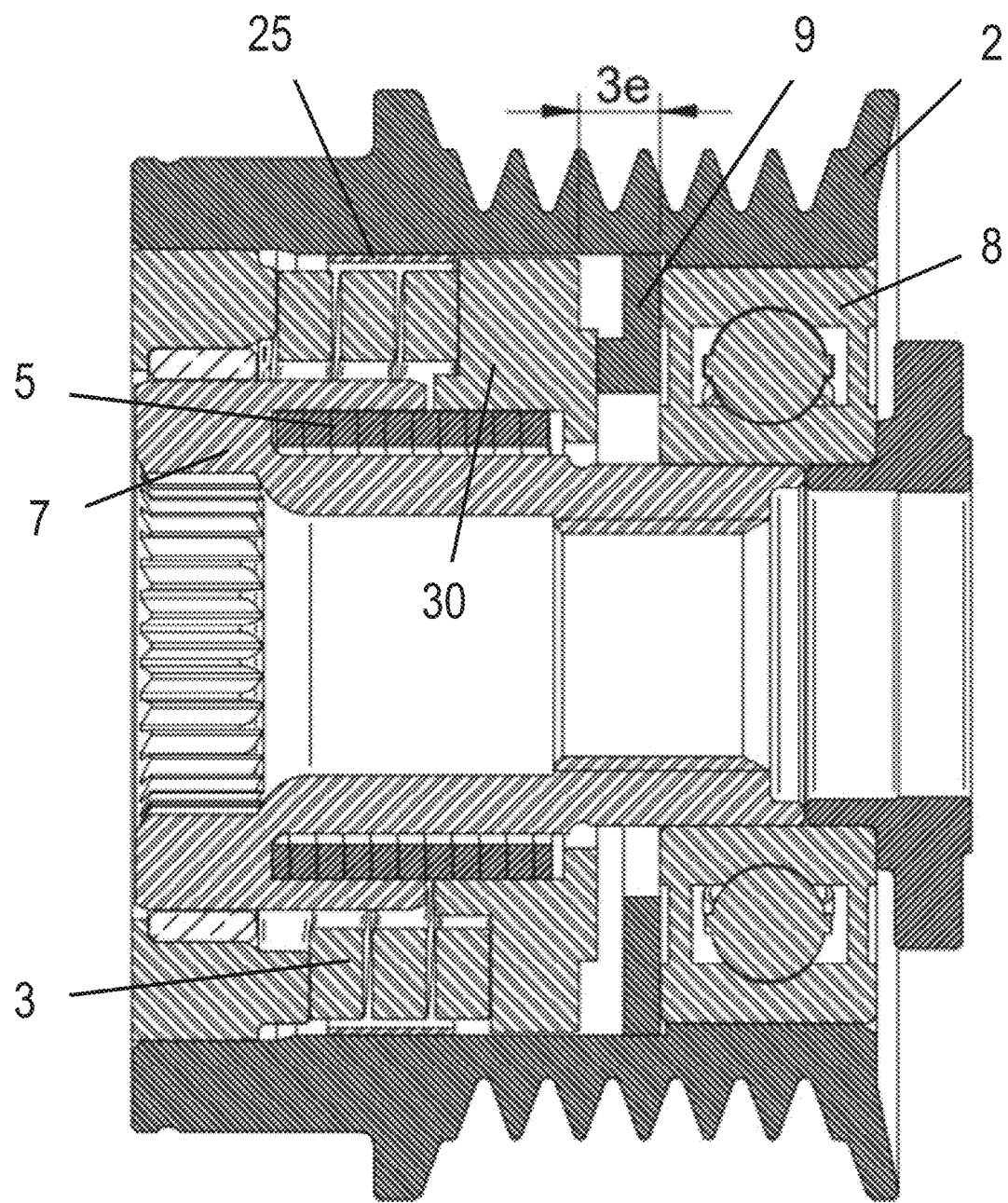
FIGS. 13C and 13D—are the detailed cross section views of the arrangement of the hub and the washer, which is mounted to the pulley, in normal operation and fail-safe mode respectively, showing the locking between the pulley and the hub.
Figure 13D:
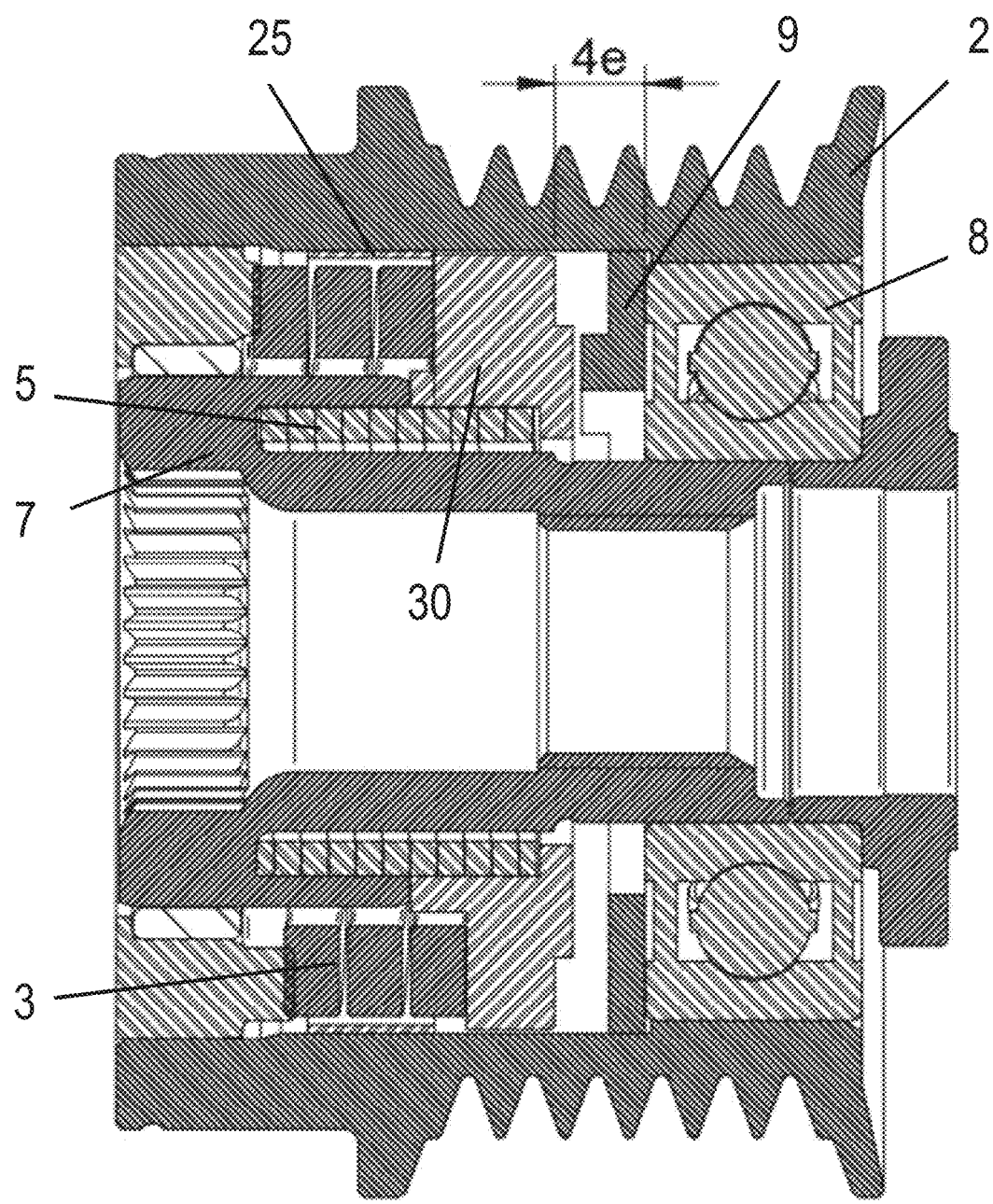

As shown in FIGS. 13C and 13D, in an alternative embodiment the washer 9 can be interconnected to the interior surface of the pulley 2 with a clearance provided between the washer 9 and the shaft 7. Like the embodiment in FIGS. 8B and 9B, the shoulders of the washer 9 and the hub 30 can drive against each other such that the hub 30 is axially displaced and locked against the shaft 7. In addition, a lock sleeve 25 can be interconnected to the interior surface of the pulley 2. Thus, when the hub 30 is axially displaced, the hub 30 locks against the shaft 7 and the pulley 2 such that the decoupler functions as a basic pulley 2.

The construction and parts of the decoupler in accordance with the invention also allow the same decoupler to be used independently as either a decoupler with free wheel system, such as one-way clutch "OWC". When the decoupler is used in its full configuration with the torsion spring 3 and clutch spring 5, it operates as an over-running decoupler system described herein. However, it can be adapted to the simpler operating mode one way clutch illustrated in FIGS. 14A and 14B by simply removing the torsion spring 3 and adding the locking means between the second hub piece 6 and the pulley 2, which allows the transmission of torque between the pulley 2 and the second hub piece 6 when the hub piece rotates in one direction.

In a preferred embodiment of the invention, to lock between the pulley 2 and the second hub piece 6, an internal stop is formed on the inner race of the pulley 2, which can contact the radial wall 64 of the second hub piece 6 allowing the transmission of torque to the second hub piece 6 when the pulley 2 rotates in one direction.

The decoupler, according the invention, also presents the advantage of sparing an additional component or system acting as torque limiter to avoid that an excessive torque causes the torsion spring to fail, unlike the couplers of the state of art.

In the decoupler of the present invention, the torsion spring is arranged between the axle hub and the pulley internal race, in a housing region, so that the spring fits to the pulley maximum internal diameter when it expands. Thus, the pulley maximum internal diameter limits (or avoids) an excessive expansion of the torsion spring, during the apply of an eventually excessive torque that may cause the spring to break. So, no additional component or system is necessary for torque limiting and for avoiding spring breakage, as the pulley structure itself, associated with the spring placement, already provides this effect.

This arrangement of the torsion spring in a housing between the axle hub and the pulley inner race also provides an additional advantage of allowing the torsion spring to have a greater diameter for the same pulley encapsulation.

Having described an example of preferred embodiment of the invention it should be understood that the scope of the present invention encompasses other possible variations, being limited solely by the terms of the appended claims, including therein all possible equivalents.

What is claimed is:

1. A decoupler, comprising:
    a pulley rotatable about a longitudinal axis, said pulley having an inner surface defining an inner cavity, said pulley configured to selectively transmit torque to a shaft;
    a pulley endstop positioned in said inner cavity and operably engaged with said pulley;
    a torsion spring positioned in said inner cavity about said shaft, said torsion spring having a first endstop and a second endstop, wherein said first endstop of said torsion spring is operably engaged with said pulley endstop;
    a hub positioned in said inner cavity about said shaft, said hub having a hub endstop, wherein said second endstop of said torsion spring is operably engaged with said hub endstop;
    a one-way clutch positioned in said inner cavity about said shaft, said one-way clutch positioned between said hub and said shaft and interconnected to said hub such that said pulley transmits torque to said one-way clutch via said torsion spring and said hub, said one-way clutch having a plurality of rollers that engage an outer surface of said shaft, each roller in said plurality of rollers having an axis of rotation that is substantially parallel to said longitudinal axis;
    wherein in a first direction of rotation of said one-way clutch, said plurality of rollers rotates freely against said outer surface of said shaft, and said pulley does not transmit torque to said shaft via said one-way clutch; and
    wherein in a second direction of rotation of said one-way clutch, said plurality of rollers engages said outer surface of said shaft, and said pulley transmits torque to said shaft via said one-way clutch;
    a first bearing element and a second bearing element positioned between said pulley and said shaft, said bearing elements configured to permit rotation between said pulley and said shaft, and wherein said bearing elements further define said inner cavity;
    a third bearing element positioned between said pulley and said hub, wherein said third bearing does not contact said shaft.

2. The decoupler of claim 1, wherein said one-way clutch is a roller clutch, and each of said rollers is biased in the same direction as said first direction of rotation.

3. The decoupler of claim 1, wherein said bearing elements are at least one of a roller bearing, a bearing bushing, and a bearing ring.

4. The decoupler of claim 1, wherein an axial length between said pulley end stop and said hub endstop is smaller than an axial length of said torsion spring in a relaxed state, wherein said torsion spring exerts an axial force on said hub to produce a controlled friction.

* * * * *